United States Patent [19]

Higgins et al.

[11] Patent Number: 5,492,002
[45] Date of Patent: Feb. 20, 1996

[54] INSTRUMENTED WHEELSET SYSTEM

[76] Inventors: Richard L. Higgins; Duane E. Otter; Robert W. Martin, all of Association of American Railroads, Transportation Test Center, P.O. Box 11130, Pueblo, Colo. 81001; Firdausi D. Irani, Chicago Technical Center, 3140 S. Federal St., Chicago, Ill. 60616; Magdy A. El-Sabaie, Association of American Railroads, Transportation Test Center, P.O. Box 11130, Pueblo, Colo. 81001; Robert M. Vandeberg, Association of American Railroads, Transportation Test Center, P.O. Box 11130, Pueblo, Colo. 81001; Randy Jackson, Association of American Railroads, Transportation Test Center, P.O. Box 11130, Pueblo, Colo. 81001; Mike E. Ring, Association of American Railroads, Transportation Test Center, P.O. Box 11130, Pueblo, Colo. 81001

[21] Appl. No.: 397,012

[22] Filed: Feb. 8, 1995

Related U.S. Application Data

[63] Continuation of Ser. No. 110,521, Aug. 23, 1993, abandoned.

[51] Int. Cl.$^6$ ................................................ G01M 17/00
[52] U.S. Cl. ................................................................. 73/1 B
[58] Field of Search ............................. 73/1 B, 1 R, 146; 364/571.01, 571.02, 578, 506, 508

[56] References Cited

U.S. PATENT DOCUMENTS

| | | | |
|---|---|---|---|
| 4,137,760 | 2/1979 | Raquet | 73/146 |
| 4,310,767 | 1/1982 | Peacock | 455/602 |
| 4,781,060 | 11/1988 | Berndt | 73/146 |
| 4,936,529 | 6/1990 | Maine | 73/146 |
| 5,351,411 | 10/1994 | Gronskov | 73/146 |

OTHER PUBLICATIONS

The B.R. Load Measuring Wheel by A. Ronald Pocklington.
Determination of Wheel/Rail Forces by Means of Measuring Wheelsets on Deutsche Bundesbahn (BD) by Heinz–Herbert Zuck.
Development and Use of an Instrumented Wheelset for the Measurement of Wheel/Rail Interaction Forces by Milton R. Johnson.
Development of a Wheel/Rail Measurement System from Concept to Implementation by Gordon B. Bakken, et al.
Measurement Techniques for Onboard Wheel/Rail Loads by Patrick Boyd, et al.
Operation of the Dual System Microcomputer for Wheel/Rail Load Analysis by Milton R. Johnson.
Instrumented Locomotive Wheels for Continuous Measurements of Vertical and Lateral Loads by J. Modranksy, et al.; Apr. 24–25, 1979.
A Superior Instrumented Wheelset by Roy A. Allen; Mar. 27, 1980.
Construction and Calibration of an Instrumented Wheelset for Measurement of Wheel/Rail Interaction Forces by Milton R. Johnson, et al.; Apr. 1980.

(List continued on next page.)

*Primary Examiner*—Robert Raevis

[57] ABSTRACT

An instrumented wheelset system and method for providing an accurate and integrated instrumented wheelset on a train or other vehicle is provided. A subject wheelset is profiled and subjected to finite element analysis. Simulated loading of the wheelset is used to help determine suitable target locations on the wheelset surface for placement of strain sensors. Simulated output of the strain sensors so positioned is recorded to develop wheel sensitivities, without inaccuracies due to strain sensor output ripple and crosstalk. The strain sensors are installed based on the modelled characteristics, and subjected to methodical calibration on a calibration fixture. After any adjustments, the wheelset may be installed on a vehicle including a computer and intelligent data acquisition units for gathering wheelplate data on a live-rolling, realtime basis.

14 Claims, 20 Drawing Sheets

OTHER PUBLICATIONS

Plate Instrumented Wheelsets for the Measurement of Wheel/Rail Forces by W. I. Thompson, III; Oct. 1980.

Calibration Guidelines and Equipments, Important Characteristics and Error Types for Instrumented Wheelsets by Tage J. Anderson; Jan. 1981.

Development and Use of Instrumented Locomotive Wheelsets by C. A. Swenson, et al.; Jan. 1981.

Instrumented Wheelset Calibration Report by Milton R. Johnson, et al.; Dec. 1982.

Operation of the Dual Systems Microcomputer for Wheel/Rail Load Analysis by Milton R. Johnson, et al.; Jan. 28, 1983.

Instrumented Railroad Wheel/Axle System vol. I–Construction and Calibration Plan Report by Milton R. Johnson, et al.; Apr. 1984.

Instrumented Railroad Wheel/Axle System vol. II–Calibration Report by Milton R. Johnson, et al.; Apr. 1984.

Westinghouse Force Sensing Wheelset System Software Manual by Pat Boyd, et al.; Sep. 22, 1989.

The Causes of Wheel Flange Wear and Derailments on MBTA Orange and Blue Lines by George A. Leighton, et al.; Dec. 1989.

Operation/Maintenance Manual for ENSCO's Wheelset Processor System; Feb. 15, 1990.

A Design for Next Generation Load Measuring Wheel Sets by Duane E. Otter, et al., (Paper presented May 21–23, 1991, St. Louis, MO).

Application of White Paper on TTX/DB Instrumented Wheelsets to Chapter XI by Keith L. Hawthorne; Feb. 24, 1992.

Track/Train Dynamics vol. 8 Mar. 1992.

High Accuracy Load Measuring Wheelset by Richard L. Higgins, et al. Paper presented Sep. 27, 1992–Oct. 8, 1992, Sydney, Australia.

Continuous Method of Measuring Forces Between Wheel & Rail and Derailment Quotients by Hiroaki Ishida, et al.; Nov. 22–26, 1993.

A New Continuous Measuring Method of Wheel/Rail Contact Forces by Hiroaki Ishida; May 1994.

MODE SHAPE PLOT
MX. DEF = 1.34E+00
NODE NUMBER = 2396
SCALE = 4.0
(MAPPED SCALING)

FULL WHEEL DYNAMIC ANALYSIS
MODE NO. = 2   FREQUENCY = 1.80887E+02 Hz

Z – Y   RX = n
 |       RY = n
X       RZ = -90

STRESS - STRAIN TRANSFORMATION

RADIAL STRAIN RESPONSE TO UNIT LOAD,
FIELD SIDE

FIELD SIDE
VERTICAL BRIDGE CONFIGURATION

VERTICAL BRIDGE OUTPUT WAVEFORMS
FOR A UNIT LOAD

GAUGE SIDE
LATERAL BRIDGE CONFIGURATION

LATERAL BRIDGE OUTPUT WAVEFORMS
FOR A UNIT LOAD

FIELD SIDE
POSITION BRIDGE CONFIGURATION

POSITION BRIDGE OUTPUT WAVEFORMS
FOR A UNIT LOAD

TWO POINT CONTACT
CONDITION

COMPARISON OF INPUT POSITIONS WITH
COMPUTED POSITION

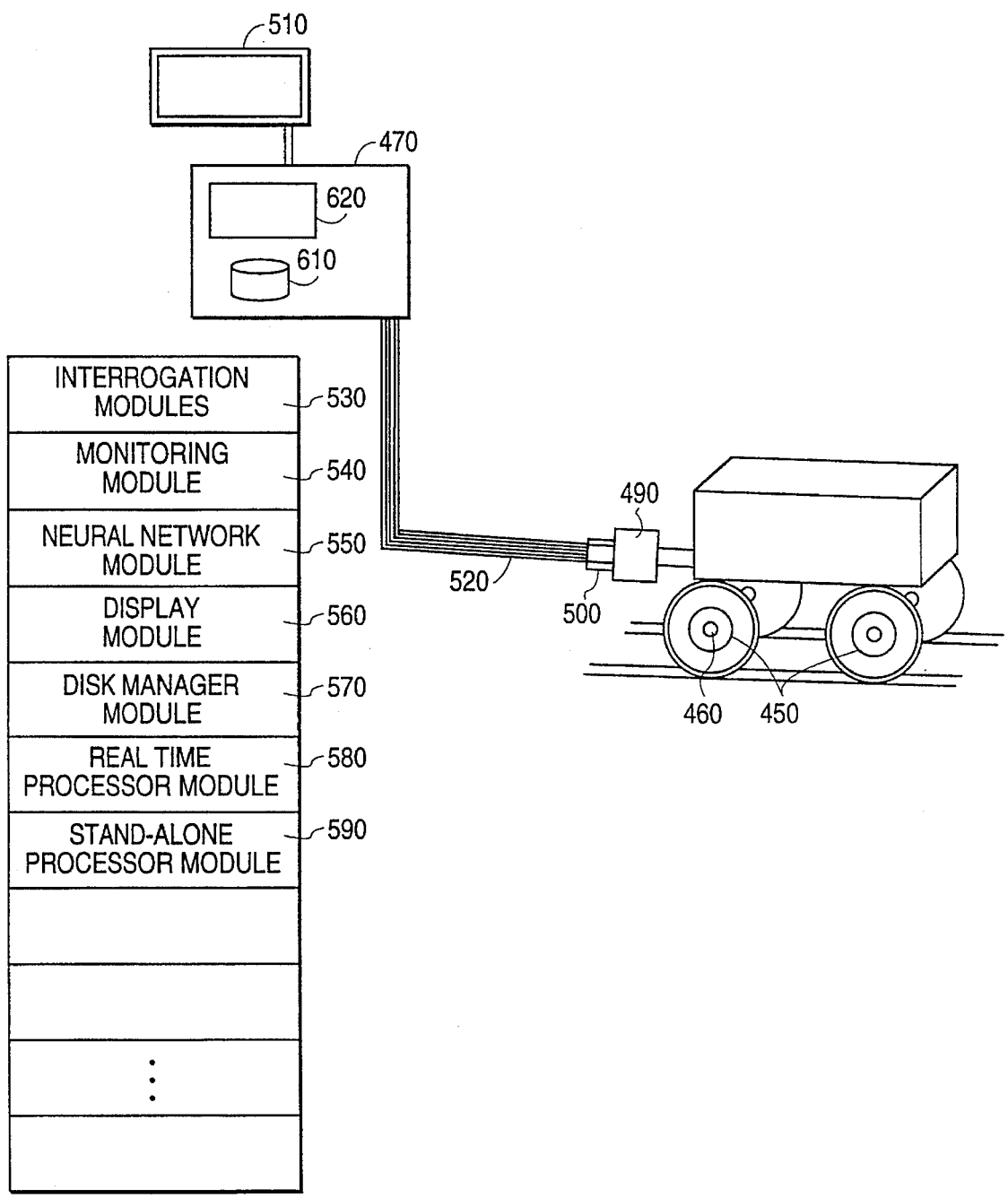

INSTRUMENTED WHEELSET SYSTEM

This is a continuation of application Ser. No. 08/110,521, filed on Aug. 23, 1993, now abandoned.

FIELD OF THE INVENTION

The invention relates to an instrumented wheelset system for measuring loads on the wheels of railroad or other wheelsets.

BACKGROUND OF THE INVENTION

Accurate measurement of mechanical strain forces on railroad wheels has long been desirable. Knowledge of those strains helps analyze wheel strength, placement, derailment and other track conditions.

Wheel strain measurement has occasionally been made with devices mounted on the track itself. However, such wayside measurement is not continuous. Devices are mounted, and measurements taken, only every so many feet.

For continuous strain measurement, some type of measuring device must be mounted to the vehicle itself. Various wheel-mounted sensor designs have been attempted.

All wheel-mounted sensor designs share a need to cleanly isolate the perpendicular forces contributing to the strain force acting on a wheel. A wheel is subject to strain force composed of vertical, longitudinal (in direction of track) and lateral (side to side of wheel) forces.

An appropriate wheelset coordinate system for describing the dynamics of wheel loads is illustrated in FIG. 1. In FIG. 1 vertical, lateral, and longitudinal forces or loads are represented as V, L and T respectively. The rotational position of the wheel is defined as $\Theta$, while the lateral position of the wheel/rail contact point is defined as P.

Isolating the orthogonal V, L and T forces in a wheel-mounted sensor design is not easy. Measuring devices trying to measure one force component often pick up signals (crosstalk) from one or the other of the directions. The exact force components impinging on the wheel from each direction can therefore be hard to identify.

Attempts to solve the crosstalk problem have been made. British Rail for instance has employed a spoked-wheel strain sensor to separate load forces. Individual spokes measure individual force components. Despite a reduction in crosstalk, the spoked-wheel design is expensive, and suffers from lower sensitivity.

Other approaches have been attempted. Deutsche Bundesbahn (DB) has mounted strain sensors on the wheel axle, rather than the wheel itself. The strain force on the wheel is derived from the axle forces actually measured. This design is relatively inexpensive, but is not sensitive to the lateral position of the contact point (P) between the wheel and the rail. A number of other parties (including the Electro-Motive Division of GM Corporation) have attempted to apply strain sensors directly to the wheelplate itself, in a variety of configurations. Hybrid axle, wheelplate and bearing designs have also been contrived.

However, wheelplate-mounted sensor designs have, among other things, still encountered difficulties with cleanly isolating the component forces. More particularly, a wheelplate wired with a typical Wheatstone bridge as a measuring strain sensor produces a (voltage) sensor output of the form:

Equation 1

$$E = f(\Theta,P)V + g(\Theta,P)L + h(\Theta,P)T$$

This output relation assumes a homogeneous, isotropic and linearly elastic wheelplate. The "f", "g" and "h" functions represent the wheelplate sensitivity to the component vertical, lateral and longitudinal forces. Those force sensitivities can be conveniently represented by Fourier coefficients. Breaking the Fourier coefficients into equations for each perpendicular direction, a Fourier coefficient matrix of the form:

Equation 2

$$\Sigma_i^4 = 1E_i^2 = \zeta_V V^2 + \eta_V L^2 + \xi_V T^2 + \kappa_V VL$$

$$\Sigma_j^2 = 1E_j^2 = \zeta_L V^2 + \eta_L L^2 + \xi_L T^2 + \kappa_L VL$$

$$\Sigma_k^4 = 1E_k^2 = \zeta_p V^2 + \eta_p L^2 + \xi_p T^2 + \kappa_p VL$$

can be used to represent the wheel.

As noted, in strain sensor designs to present, isolating individual force components out of the output shown in Equations 1 and 2 has been difficult, because of crosstalk and other problems. Designs have attempted to isolate force components by methods such as placing the strain sensors in special areas of the wheelplate, and adjusting measuring circuits to dampen crosstalk. If the wheelplate sensitivity is represented in a matrix of Fourier coefficients, the special area may sought by trying to drive the non-diagonal coefficients to zero.

But "zeroing out" the matrix of Fourier coefficients is hard to achieve with precision. Practice has shown that this can only be accomplished with sensors mounted at very limited portions of the wheel, and at only a single contact position (P). This unduly restricts the sensor certain placement, and is not an effective or general solution.

As seen in Equation 2 the inventors have shown that it is not necessary to eliminate the non-diagonal elements of the coefficient matrix. The only requirement for obtaining a valid solution to the system of equations is that the coefficient matrix remain well conditioned for all loads and contact geometries. That is to say, the three equations depicted in Equation 2 must be linearly independent for all loads and contact geometries.

SUMMARY OF THE INVENTION

It is accordingly an object of the invention to provide an instrumented wheelset system to measure loads on the wheels of railroad or other vehicles capable of highly accurate force measurements of all force components acting on a wheelplate.

It is another object of the invention to provide an instrumented wheelset system whose measurements may be taken without regard to rotational position of the wheel.

It is another object of the invention to provide an instrumented wheelset system whose output is resistant to noise corruption.

It is another object of the invention to provide an instrumented wheelset system whose measurements may be taken continuously.

It is another object of the invention to provide an instrumented wheelset system using a relatively small number of strain sensors.

It is another object of the invention to provide an instrumented wheelset system producing a stable sensor output signal.

It is another object of the invention to provide an instrumented wheelset system to provide a method of producing a wheelset strain sensor output of high quality and reliability.

It is another object of the invention to provide an instrumented wheelset system adapted for implementation on either a worn or new wheel.

It is another object of the invention to provide an instrumented wheelset system capable of measuring wheelplate forces with a maximum error of approximately 2 percent of the nominal static wheel load.

It is another object of the invention to provide an instrumented wheelset system capable of performing over a continuum of wheel velocities, including when the vehicle is moving slowly or at a standstill, or at high speed.

It is another object of the invention to provide an instrumented wheelset system including multiple-wear wheels, to maximize the working life of the measuring instruments.

It is another object of the invention to provide an instrumented wheelset system which dispenses with the need for axle encoders or other devices to track wheel rotational position.

It is another object of the invention to provide an instrumented wheelset system whose strain sensor circuits are primarily responsive to loads in a single direction, reducing or eliminating crosstalk from orthogonal loads.

It is another object of the invention to provide an instrumented wheelset system having diagnostic capabilities to be able to perform integrity checks on strain sensor output signals.

It is another object of the invention to provide an instrumented wheelset system whose strain sensor outputs are linearly independent under all load conditions.

It is another object of the invention to provide an instrumented wheelset system having self-diagnostic capabilities able to perform integrity checks on strain sensor output signals.

It is another object of the invention to provide an instrumented wheelset system capable of continuously measuring the lateral position of the contact point of the wheel.

The invention achieving these and other objects is an instrumented wheelset system including apparatus and method for installing strain sensors at optimal positions, apparatus and method for calibrating a wheelset with sensors installed, and apparatus and method for acquiring wheelset data on a vehicle. The instrumented wheelset system of the invention produces an instrumented wheelset having a plurality of strain sensors installed on the wheelplate according to accurately modelled characteristics of the wheelplate. Component forces from the output of the strain sensors installed at those positions are readily and cleanly derived. The system stores those strain forces and can further analyze the gauged wheelset, including for refining calibration.

The instrumented wheelset system of the invention provides as well a calibration fixture for securely holding an instrumented wheelset, and verifying static strain properties of that wheelset. The system of the invention moreover provides a data acquisition system for intelligently gathering strain force data from a gauged wheelset, including during live rolling testing in realtime.

As suggested by the foregoing, the instrumented wheelset system of the invention is a thoroughly and deliberately integrated system. The invention has been designed for complete cooperation of all components to the end of providing the most accurate, reliable wheelset data possible. The target accuracy of 2% for the instrumented wheelset system is designed to be maintained under a wide range of loading conditions and contact geometries, including two point contact at a high angle of attack.

BRIEF DESCRIPTION OF THE DRAWINGS

The invention will be described with reference to the drawings, in which like parts are labelled with like numbers. The drawings are briefly described below.

FIG. 24 illustrates a data acquisition system including monitoring computer running channel interrogation modules;

DETAILED DESCRIPTION OF THE DRAWINGS

Figure 2:
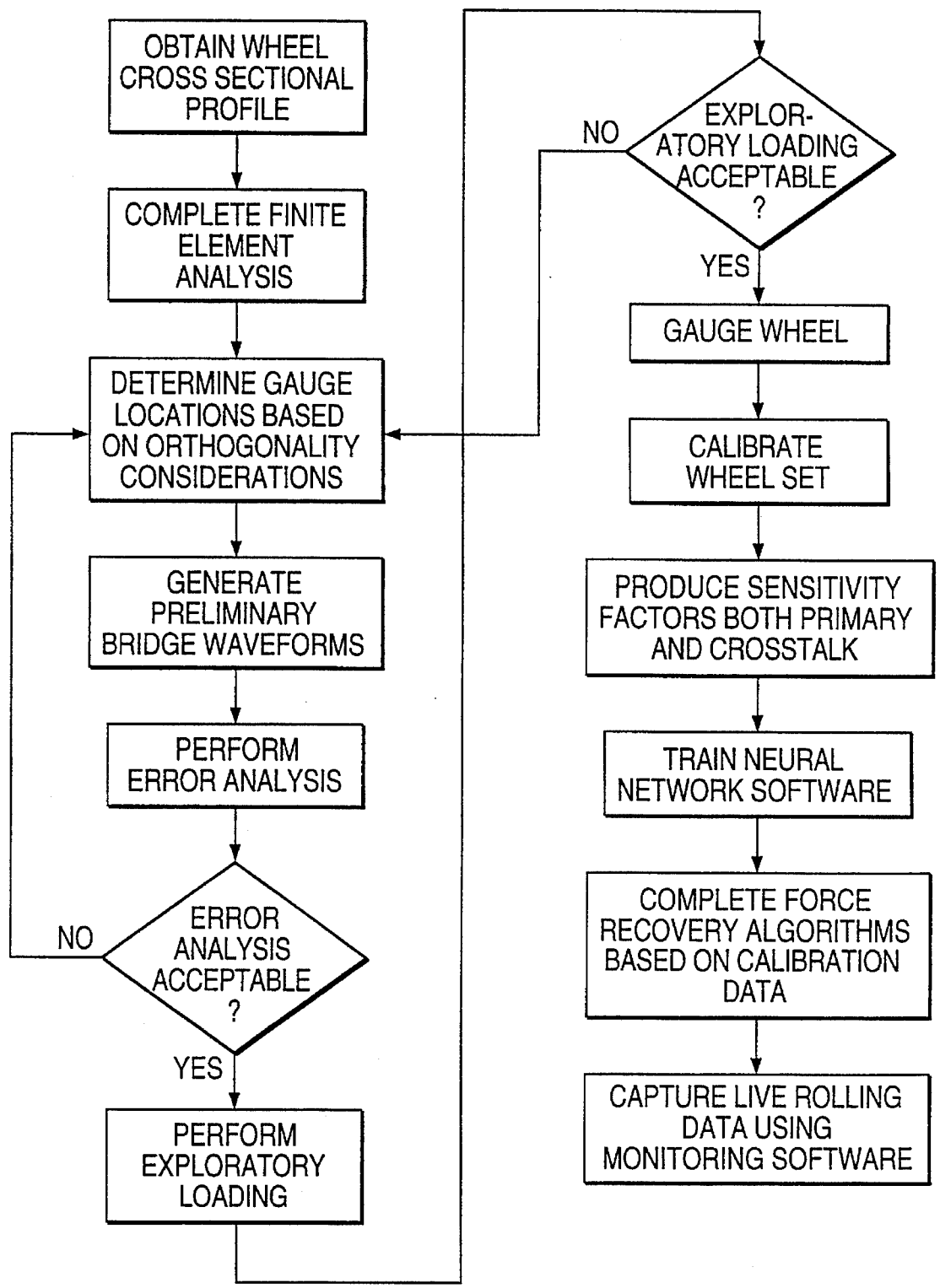
FIG. 2 illustrates a flowchart of steps in the process of installing and measuring data from an instrumented wheelset according to the invention.
Figure 3:
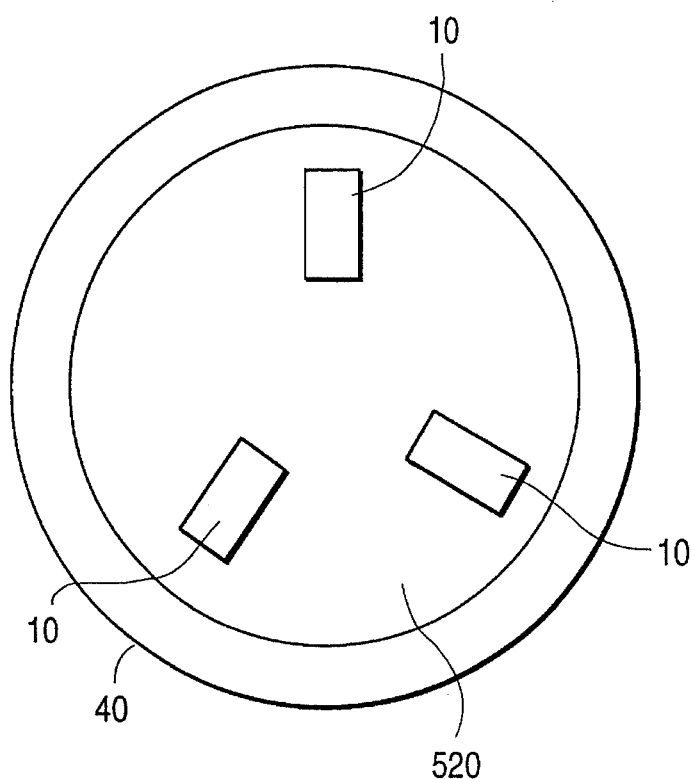
FIG. 3 illustrates an instrumented wheelset including wheelplate-mounted strain sensors.

A flowchart of an embodiment of the instrumented wheelset system of the invention is illustrated in FIG. 2. This embodiment provides an instrumented wheelset having strain sensors 10 advantageously placed to pick up strain sensor signals, as illustrated in FIG. 3.

Figure 4:
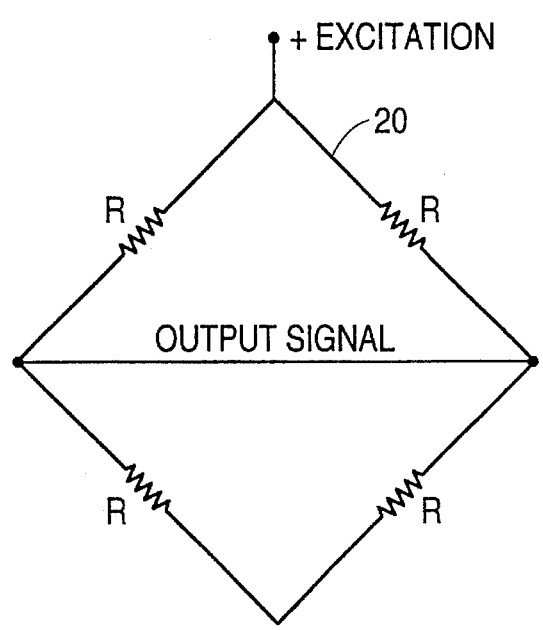
FIG. 4 illustrates a configuration of strain sensors implemented as Wheatstone bridges.

The strain sensors 10 themselves may be constructed as electrical Wheatstone bridges 20, illustrated in FIG. 4. Wheatstone bridges will be familiar to persons skilled in the art, and are readily constructed as symmetric arms of strain gauges 30. Other strain sensors may also be used.

Figure 1:
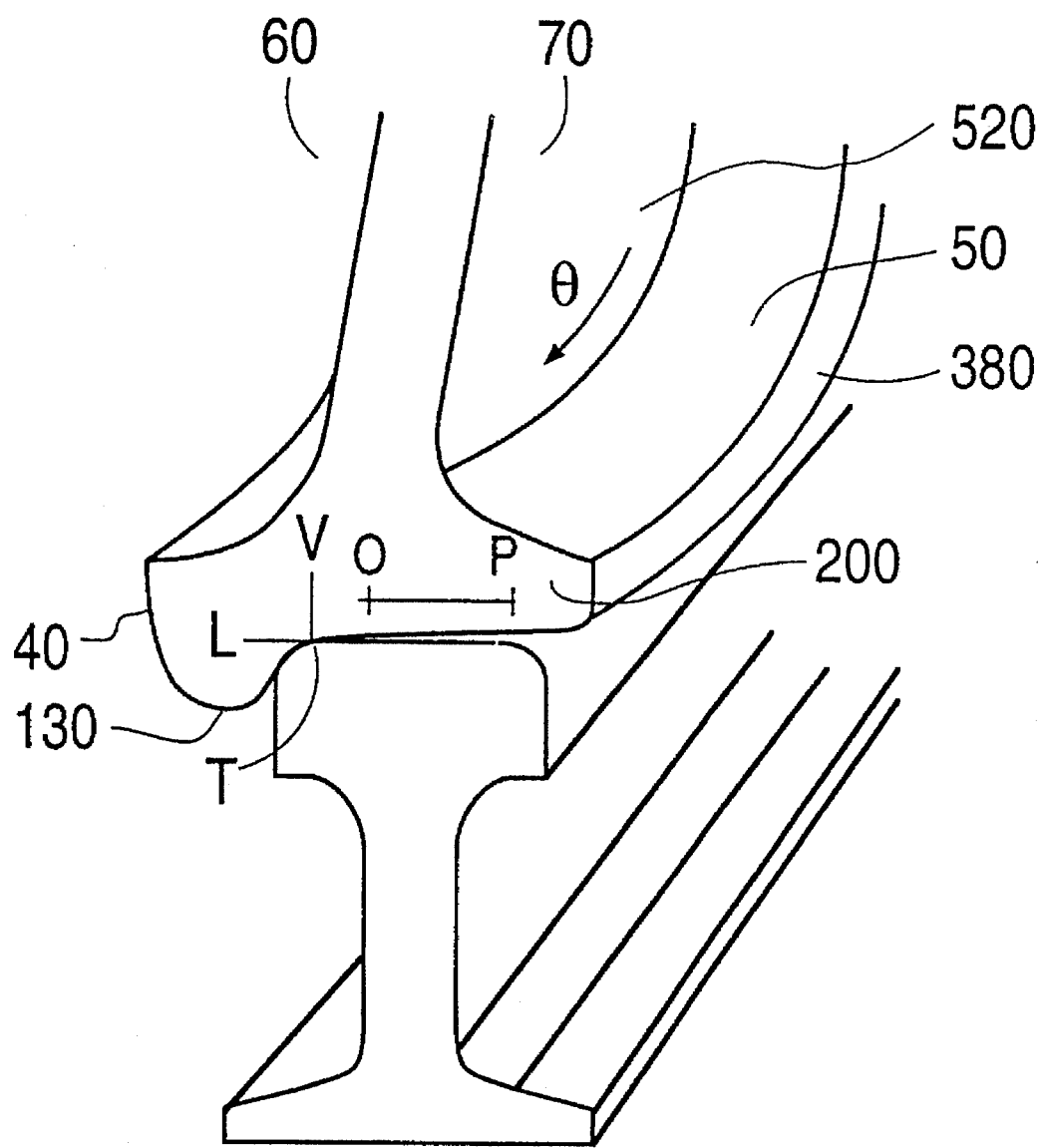
FIG. 1 illustrates a wheelset and coordinate system.

The wheel itself include a wheelplate 520, flange 40, tape tread 50, field side 60 and gauge side 70 of the wheelplate, as illustrated in FIG. 1.

SUBJECT WHEELSET

Figure 25:
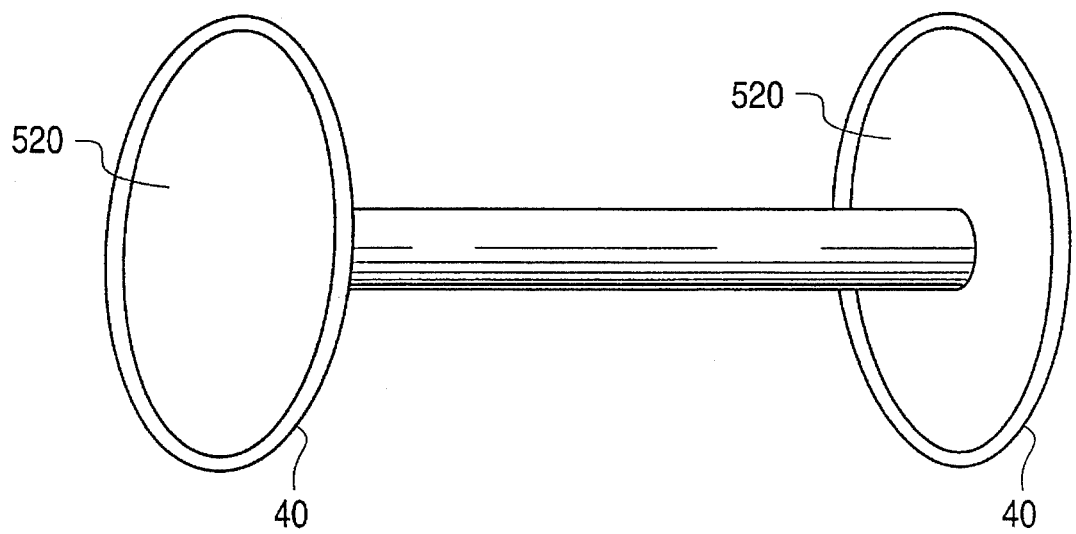
FIG. 25 illustrates a schematic of a typical subject wheelset.

In constructing and operating an instrumented wheelset according to the invention, a subject wheelset 80 (illustrated in FIG. 25) is first settled on. An advantage of the invention is that it may be employed on a variety of wheels, small and large, for instance locomotive, small rail car or other. The inventors have successfully implemented the instrumented wheelset system of the invention in 33 and 40" wheels, for instance. In contrast, previous instrumented wheelsets were not as versatile. Their lower sensitivity and other parameters often required a vehicle of at least a certain bulk.

Given a subject wheelset 80, that wheelset is first measured to determine its profile. The wheelplate may be cut according to American Association of Railroads (AAR) standards for shape and thickness. The inventors have as an example prepared wheelsets machined out of forged crane wheel blanks, heat treated to produce a standard Class C (curved) wheel. Determining a wheelset profile is important because industrial railroad and other wheelsets are usually not of a completely simple shape, so the mechanics of the wheelset are complex and dependent upon the wheelset profile. Profiling may be done by a variety of methods, as will be familiar to persons skilled in the art.

Figure 5:
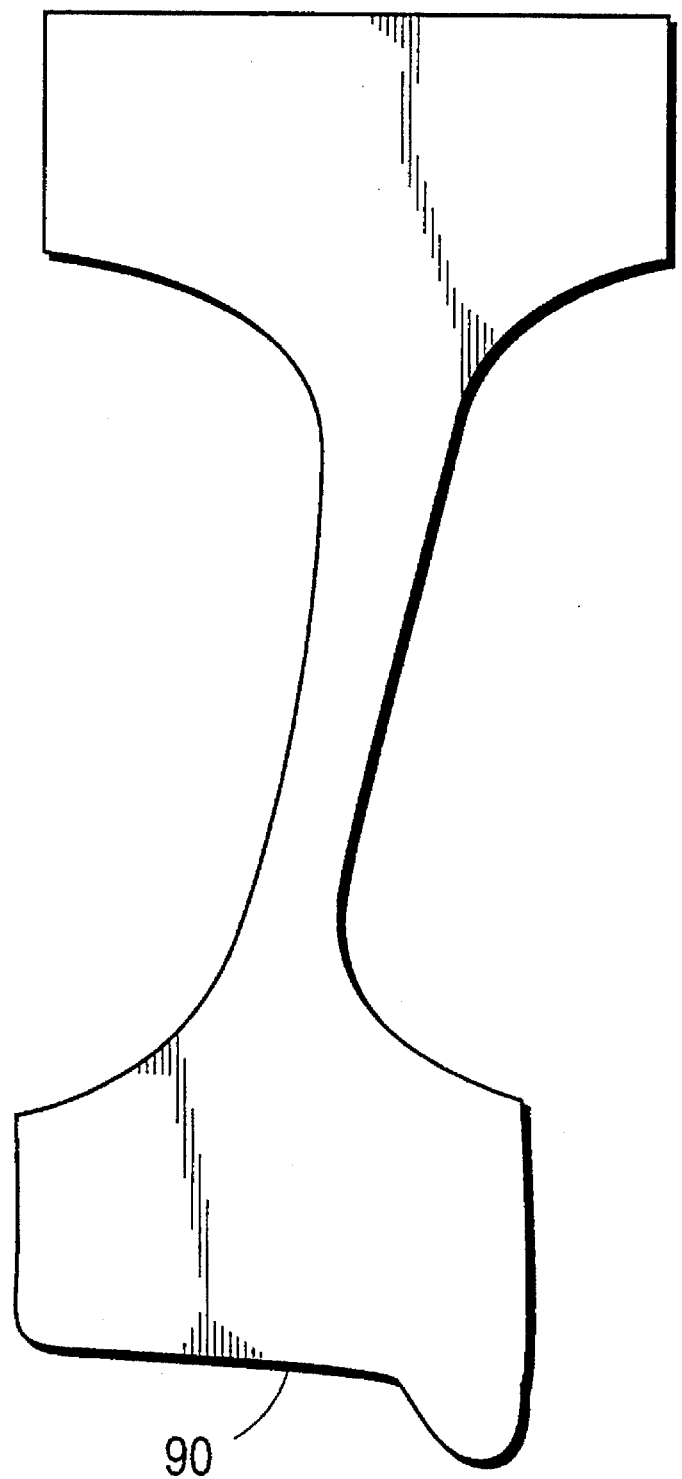
FIG. 5 illustrates a multiple-wear wheelset.

To marked advantage, the instrumented wheelset system of the invention may be implemented on either a brand new wheel, or even a well-worn wheel. On a new wheel, a full-thickness, multiple-wear tread 90 is used to ensure a longer working lifetime, as illustrated in FIG. 5. A multiple-wear tread resembles an ordinary wheel tread, but is slightly thickened. But the instrumented wheelset system of the invention is equally effective on wheels in either pristine or worn condition, a notable practical advantage. Of course, the instrumented wheelset system of the invention preferably provides sensors on each of the two wheels of subject wheelset 80, derived similarly as discussed hereinbelow.

SENSOR PLACEMENT

The inventors have with much effort devised a strategic method for determining placement of the strain sensors in each of vertical, lateral, position and longitudinal positions to yield the most accurate strain sensor output possible. The number of sensors required to produce the desired rotationally-independent output turns out to be dependent on the harmonic content of the individual sensor outputs, as described below. Placement modelling simulates preliminary sensor output to help determine harmonically "lean" positions.

For sensors with symmetrical, oscillating outputs, the response to a component load at a given contact position P can be expressed as a Fourier series, in the form:

Equation 3

$$E = \sum_{i=1}^{m} a_i \cos\{n(2i-1)[\Theta - \phi/n]\}$$

where m is the number of harmonics contained in the sensor signal, n is the frequency of the waveform in cycles per wheel revolution, and $\phi/n$ is the phase angle of the output.

For a single sensor whose output oscillates once per wheel revolution, which is centered about zero rotational angle, and containing a fundamental plus a third harmonic, Equation 3 would take the form:

$$E_1 = a_1 \cos\Theta + a_2 \cos 3\Theta$$

A similar sensor centered around a rotational angle of 90° would take the form:

$$E_1 = a_1 \cos(\Theta - 90) + a_2 \cos 3(\Theta - 90)$$

To derive a constant (non-oscillating) signal whose output does not depend on rotational position ($\Theta 0$ of the wheel) temperature or other factors, the sum of the squares of each of the sensor signals is combined as follows:

Equation 4

$$E = \sum_{i=1}^{N} E_i^2 = E_1 2 + E_1 2 + E_2^{2+} E_3^{2+} \cdots + E_N^2$$

The number N in Equation 4 represents the number of sensors required to produce an output which is completely independent of rotational position. N is determined by the harmonic content of the sensor waveform, and is determined as follows:

TABLE 1

| Harmonic Content | No. of Sensors | Angle Between Sensors |
| --- | --- | --- |
| Fundamental | 2 | 90° |
| Fundamental + Third Harmonic | 4 | 45° |
| Fundamental + Third, Fifth Harmonics | 6 | 30° |
| Fundamental + Third, Fifth and Seventh Harmonics | 8 | 22.5° |

In addition to ensuring the rotational independence of the combined waveforms, an additional requirement influencing the placement of all sensors is linear independence. The waveform harmonic content must be suitably reduced while maintaining strong orthogonality in the final system of equations. A part of the initial error analysis (described below) determines how strongly orthogonal the final system of equations will be.

Once the wheelplate profile of the subject wheelset is determined, placement of the strain sensors 10 is rigorously determined. Given a wheelset, new or worn, strain sensor placement is begun by performing an initial finite element analysis using the wheelset profile data. Finite element analysis will be familiar to persons skilled in the art, and may be carried on any suitable computer and using any of a number of commonly available software packages (including CAD programs). In the worn wheel case, the wheel is assumed to have only the minimum allowable tread thickness (0.73 inches, AAR Manual of Standards and Recommended Practices, 1989 incorporated herein by reference; see Section G).

Figure 6:
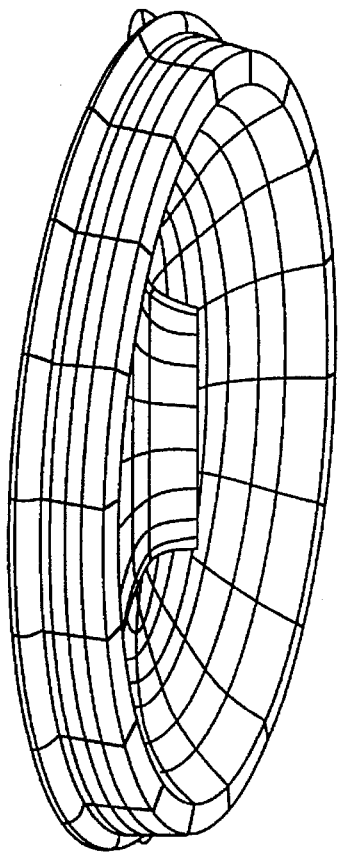
FIG. 6 illustrates a finite element analysis of a wheelplate profile.

In either a new or worn case, the initial finite element model to analyze the subject wheelset is built using two-dimensional, axisymmetric elements representing a portion of the wheel. Each element can receive non-axisymmetric loads. The finite element model may typically use about 80 such elements, each being a second order, eight-nodequadrilateral. 80 elements has been found a good compromise between accuracy and computational efficiency. A total of about 300 finite element nodes may be derived from the 80 elements used. The goal is to capture in the finite element model stress distributions on surfaces of the wheelplate which are likely targets for strain sensor placement. An illustration of computer modelling of an appropriate finite element analysis is illustrated in FIG. 6.

The initial finite element analysis may apply at least nine loading conditions. Unit vertical, lateral, and longitudinal loads (1 kip or 4.5 kN) may be applied to at least three positions on the wheel tread: near the root of the flange 40, near the tape line 100, and near the field side of the tread 60. The unit applied load in the finite element model may be simulated with a long-term Fourier expansion of a delta (impulse) function. A 20-term Fourier expansion has likewise been found a good compromise between accuracy and computational efficiency.

In the initial finite element model, applying the unit loads induces strain in the wheelplate 520. Resulting strain is then calculated around the wheelplate circumference, for instance at 5° intervals half way around the wheel. Strain due to vertical (T) and lateral (L) loads is symmetric the rest of the way around the wheelplate, and therefore need not be calculated further. Strain due to longitudinal loads (T) is not symmetric around the circumference of the wheel, and therefore must be calculated all of the way around.

Figure 7:
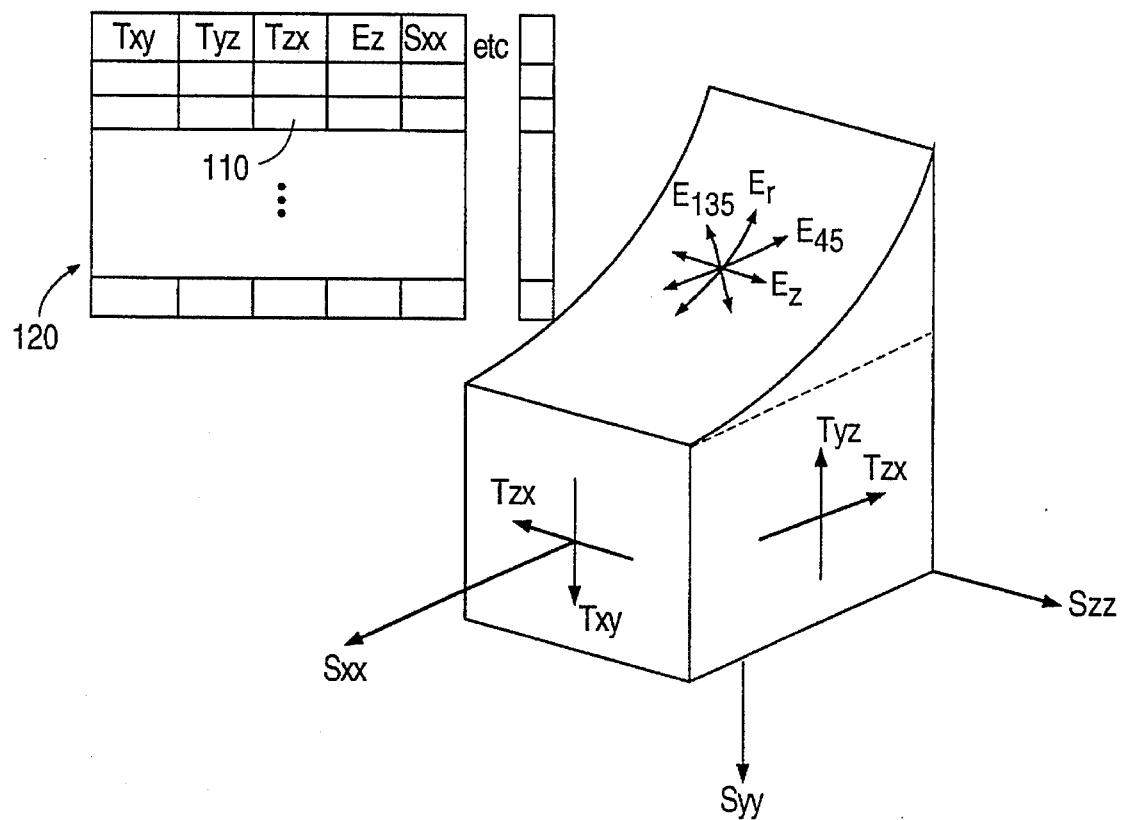
FIG. 7 illustrates a stress/strain mapping.

The strain loads from the wheelplate circumference are next appropriately related (or mapped) to wheelplate surface strains, as illustrated in FIG. 7. Resulting mapping 110, relating strain loads to surface strains, is stored (for instance as computer file 120). Mapping 110 provides strain data similar to that which could be obtained experimentally. From the strain mapping 110, output behavior of almost any type of strain sensor can be reliably simulated. The stored strain mapping 110 is used to decide where to place the strain sensors, and to simulate Wheatstone bridge or other strain sensor responses placed at those target positions.

Given the strain mapping 110, proper target placement of the strain sensors is made through another, placement modelling, which produces simulated sensor outputs around target positions using the results of the finite element analysis and mapping. Proper placement of strain sensors 10 on the wheelplate 520 is very important to ensure clean signals, low crosstalk and good sensitivity. The prime positions for sensor placement are particularly influenced by radial surface strains on the wheelplate caused by vertical and lateral loads.

Figure 8:
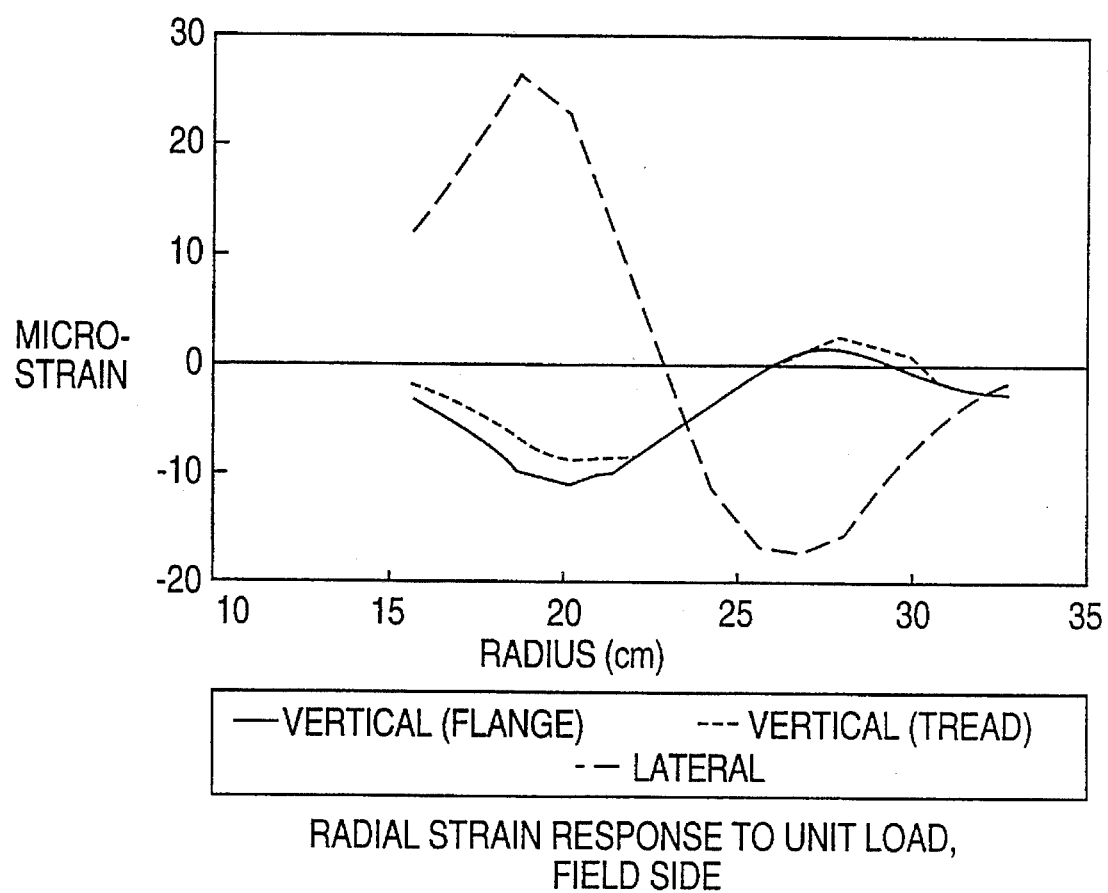
FIG. 8 illustrates a graph of strain response versus radial position (field side)
Figure 9:
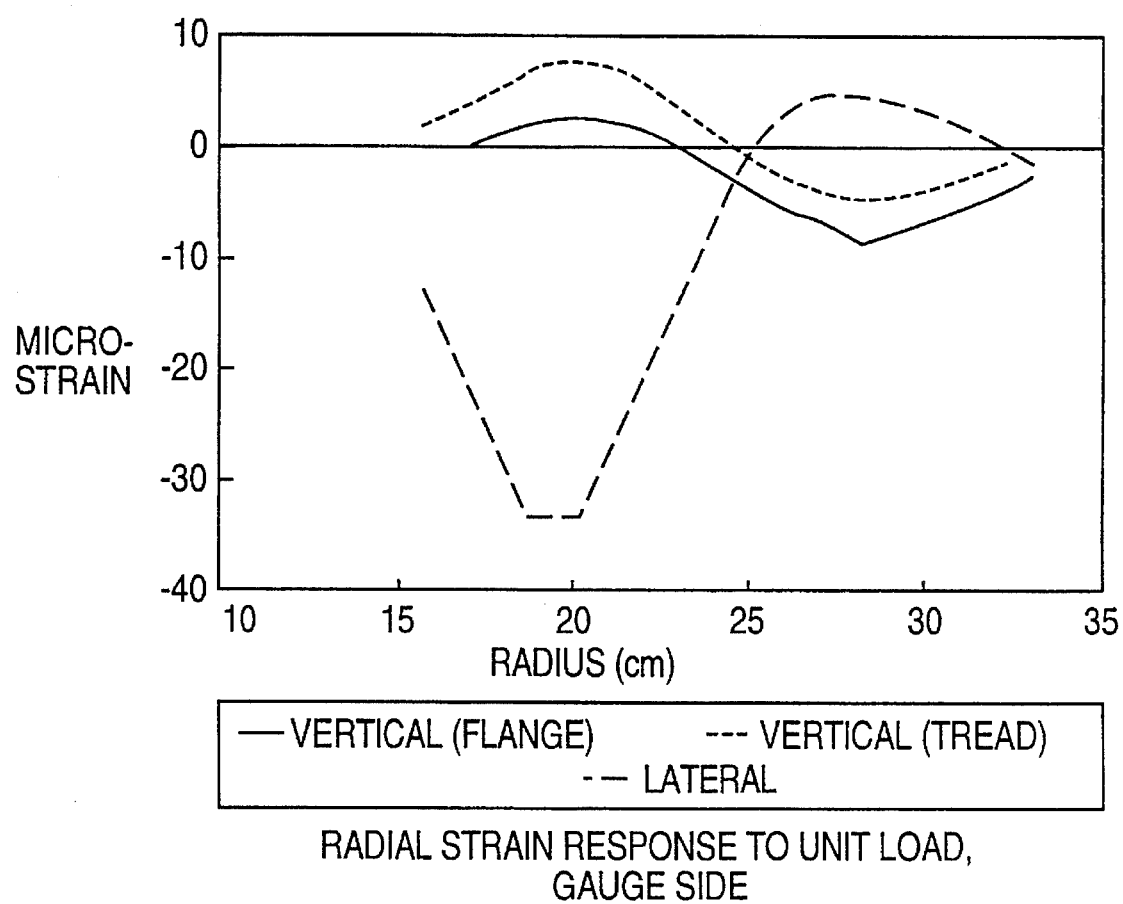
FIG. 9 illustrates a graph of strain response versus radial position (gauge side)

Radial strains appearing on the field side of a new, multiple-wear wheel as revealed by the placement modelling are illustrated in FIG. 8. Strain maps on the gauge side of the same wheel are illustrated in FIG. 8. Vertical loads applied near the flange 40 produce different strains than those applied near the field side of the tread 130, particularly in Class C (curved) wheels. Strains due to lateral loads, in contrast, are nearly identical regardless of where they are applied, because the line of force across the wheelplate remains nearly constant.

Placement modelling of a new multiple-wear wheel necessarily requires separate strain maps for both the new wheel and the worn wheel conditions. The sensor positions selected must perform adequately throughout the wheel working life. Sensor sensitivities must not vary much as the wheel becomes worn and tread thickness decreases.

A. Vertical Sensor Placement

Vertical sensors 140 should be located at a spot on the wheelplate 520 where there is a large sensitivity to vertical load. Generally, the higher the frequency of the vertical sensor output (in terms of oscillations per wheel revolution), the lower the sensitivity that can be obtained.

Figure 10:
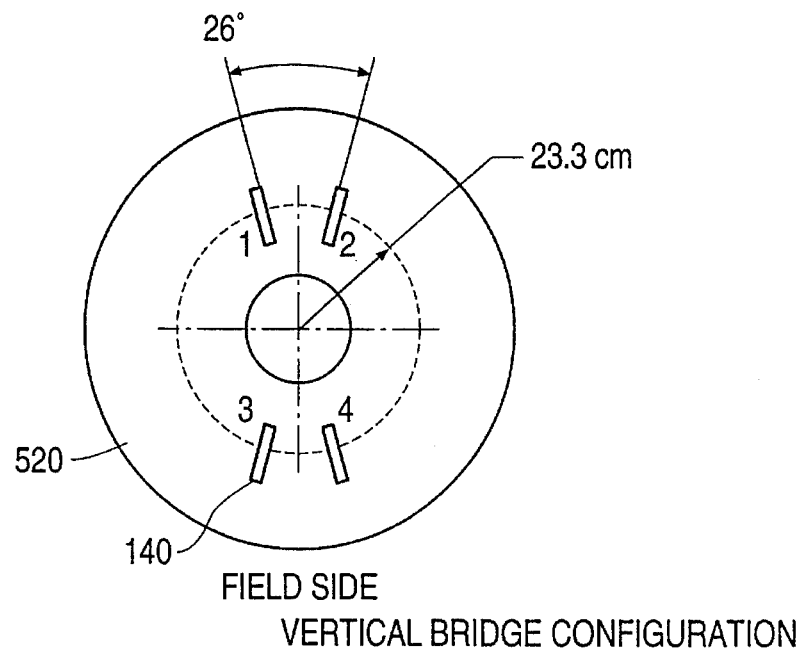
FIG. 10 illustrates a configuration of a vertical wheelplate sensor.

As described previously, the combined sensor output signal can be made independent of rotational position. In practice the inventors have found it possible to use fewer sensors to achieve target accuracies, substantially lowering construction costs. Specifically, the inventors discovered that desired accuracies could be achieved with four vertical sensors, two lateral sensors, and four position sensors. Positions of individual strain gauges within each sensor and the position of the sensors (Wheatstone bridges) are illustrated in FIG. 10. Vertical sensor sensitivity of about 14 microstrain per kilopound is typical for such a design. Also, vertical sensor response at positions illustrated in FIG. 10 is similar for new and worn wheels.

Figure 11:
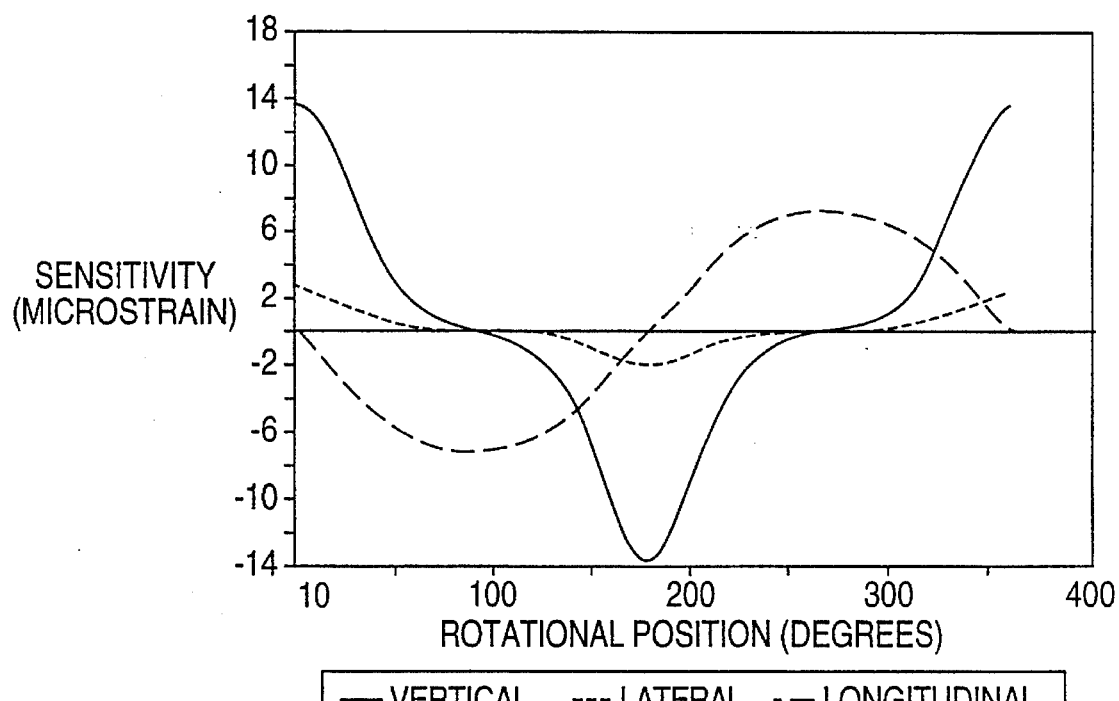
FIG. 11 illustrates a graph of vertical sensor output versus rotational position.
Figure 12:
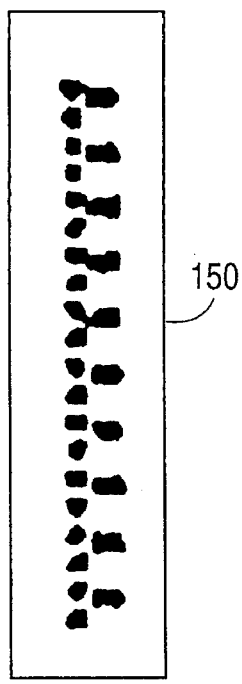
FIG. 12 illustrates a gradient strain gauge, such as could be used for exploratory gauging.

The relatively sharp gradient at the desired vertical position, as illustrated in FIG. 11, demands accurate sensor placement to obtain uniform signals. Actual exploratory loadings on the subject wheel plate may be done using gradient strain gauges 150, which are illustrated in FIG. 12 and described more fully below. Exploratory gauging is used to verify the finite element model strain mappings and ensure the accuracy of vertical sensor placement.

In practice, the inventors have successfully implemented a total of four vertical Wheatstone bridges, using sensor positions fixed at a radius of about 23.3 cm (9.2 inches) on the field side of the wheel.

The output of the vertical sensors 140 does not vary much with changes in temperature and inertia. The output of vertical sensors 140 oscillates as the wheel rotates, taking on a generally sinusoidal form, as illustrated in FIG. 11. The vertical sensor configuration also has high sensitivity, making signal conditioning easier.

FIG. 11 illustrates the vertical sensor output waveforms, again in generally sinusoidal form. The sinusoidal form of the output of the vertical sensors 140 so constructed is advantageous. The generally sinusoidal form allows treatment with the trigonometric identities described to recover a constant output. In the vertical sensor arrangement of four strain gauge arms per Wheatstone bridge, harmonic content is suitably reduced. FIG. 10 illustrates an arrangement of the vertical sensors, spaced 45° apart. The output of vertical sensors constructed in this manner may contain both a fundamental and a third harmonic. Harmonic content above that is essentially negligible.

To marked advantage, because of the constant property of the combined (sum-of-squares) signal in the invention, the need for an axle encoder is totally eliminated. All distortions and inaccuracies associated with an axle encoder, such as ripple, error in measured rotational position, etc. are therefore done away with. Because the vertical sensor output does not have to be treated to damp or eliminate that ripple, further processing and circuitry is also eliminated.

As noted, the angular positions of the vertical sensors 140 are chosen to minimize any residual ripple in the combined signal due to higher-order harmonics. The more higher-order (generally fifth and above) harmonic content appearing in the output, the more the behavior of the combined sensor output would deviate from a sinusoid, so that additional sensors would be required to achieve rotational independence.

B. Lateral Sensor Placement

Figure 13:
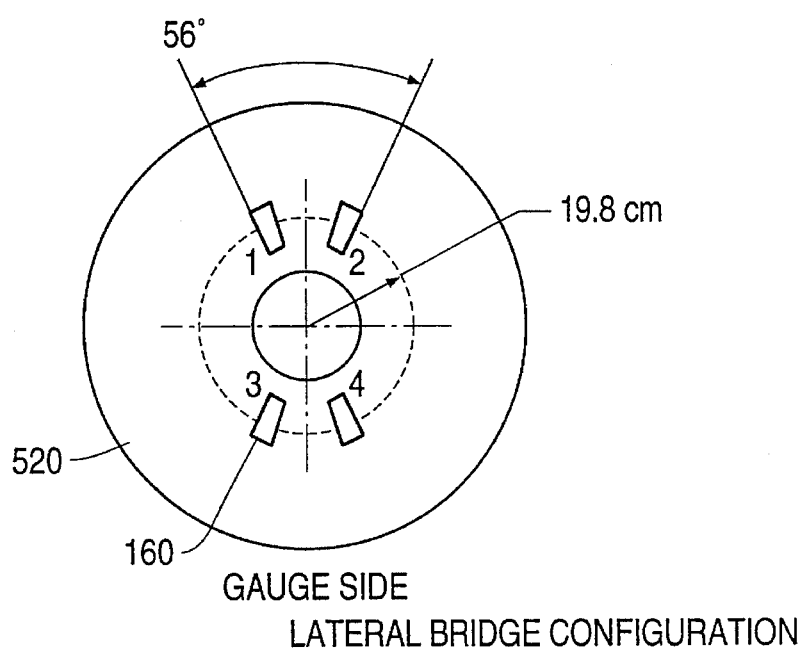
FIG. 13 illustrates a configuration of a lateral wheelplate sensor.

The lateral strain sensors 160 are installed similarly to the vertical sensors. The inventors have as an example preferably installed two Wheatstone bridges with gauges fixed at a lateral position of a radius of 19.8 cm (7.8 inches) on the gauge side of the wheelplate 520, as illustrated in FIG. 13. Wheelplate strains at this position are primarily due to lateral loads.

Lateral sensor output at this position is essentially sinusoidal with negligible harmonic content. If two lateral sensors are phased 90° apart, the individual bridge outputs can be expressed as:

Equation 5

(A) $E_1 = a_1 \cos\Theta$ (E) $E_2 = a_1 \cos(\Theta - 90) = a_1 \sin\Theta$

Using the trigonometric relationship:
Equation 6

$$a_1^2 \cos^2\Theta + a_1^2 \sin^2\Theta = a_1^2$$

it can be shown that the combined signal is constant, and independent of rotational position.

Worn wheel response is similar, except that the sensitivity to lateral load is slightly lower because of decreasing tread thickness and hence moment arm. Since there are no sharp strain gradients at this position, placement of the lateral strain sensors is not as critical as for the vertical sensors. Exploratory gauging may therefore not be necessary for lateral sensors, though it can still be performed.

As noted previously, the lateral sensors 160 produce a sinusoidal output as the wheel rotates, as illustrated in FIG. 12. The output of the lateral sensors 160 does not vary with temperature and inertial effects. Sensitivity is high, providing a good signal-to-noise ratio throughout later signal conditioning.

Due to the sinusoidal nature of lateral sensor output, each wheel requires only the two lateral sensors. The combined signal formed by taking the sum of the squares of each lateral sensor signal is also virtually constant, independent of the rotational position ($\Theta$) of the wheel.

As with the vertical sensors, the angular locations of the lateral sensors 160 are preferably chosen to minimize the ripple in the combined signal due to higher-order harmonics. The use of two lateral sensors with essentially sinusoidal outputs, phased 90° apart, has been implemented by the inventors in more than one constructed wheelset, and proven to be effective. Residual ripple of this combined signal is quite low.

C. Contact Position Sensor Placement

Figure 14:
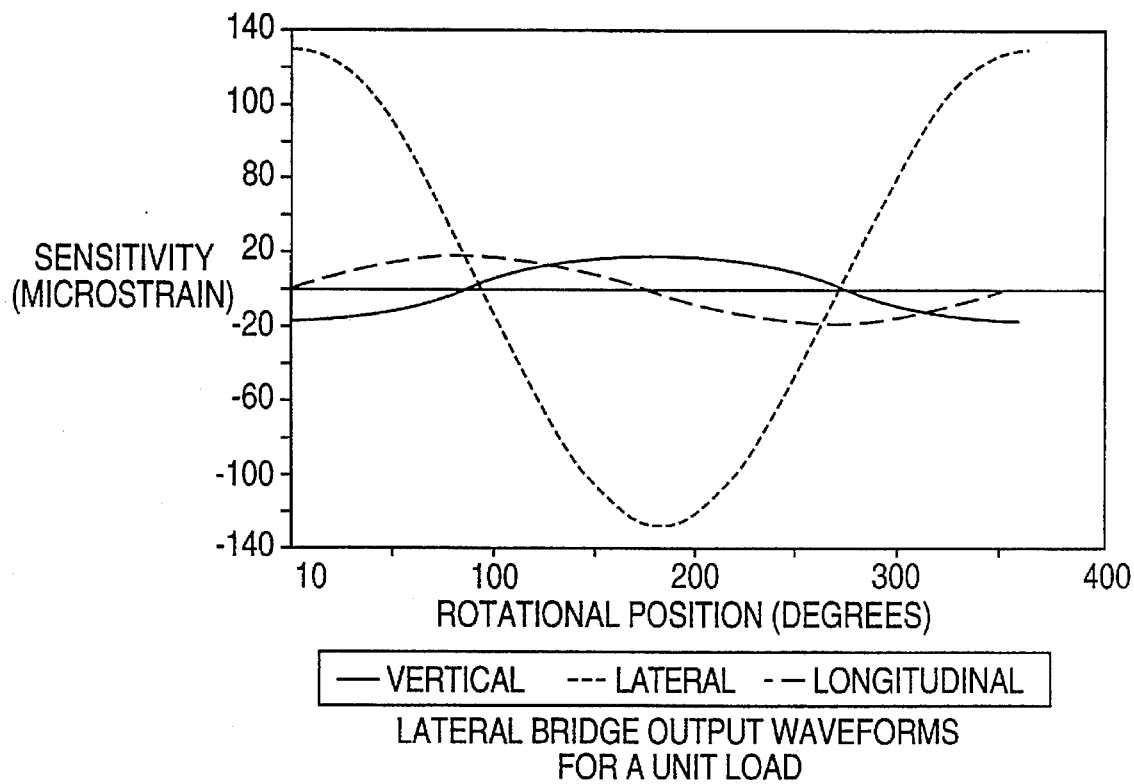
FIG. 14 illustrates a graph of lateral sensor output versus rotational position.

The instrumented wheelset system of the invention also provides another set of strain sensors 170 whose sole purpose is to monitor the contact position or point (P) of the wheel against the track surface, as illustrated in FIG. 14. Contact position (P) is taken relative to the tapeline of the tread 200. That contact position can vary significantly across the track surface, from all the way out at the wheel flange to an inner position near the edge of the track.

Accurately determining the contact position (P) allows later corrections to be made to account for variations in sensitivities and crosstalk. The contact position sensors 170 should have minimal sensitivity to lateral loads, but exhibit a pronounced gradient in vertical load sensitivity as a function of contact point P.

Bearing in mind that the invention encompasses both new and worn wheels, the strain maps illustrated in FIGS. 11 and 13 suggest that finding a suitable position which works adequately for both wheel conditions is difficult. A contact position sensor with an output frequency of two cycles per wheel revolution has been developed. The resulting position sensor configuration is illustrated in FIG. 14. As with the other sensors, the contact position sensor 170 is insensitive to changes in temperature and inertia.

Figure 15:
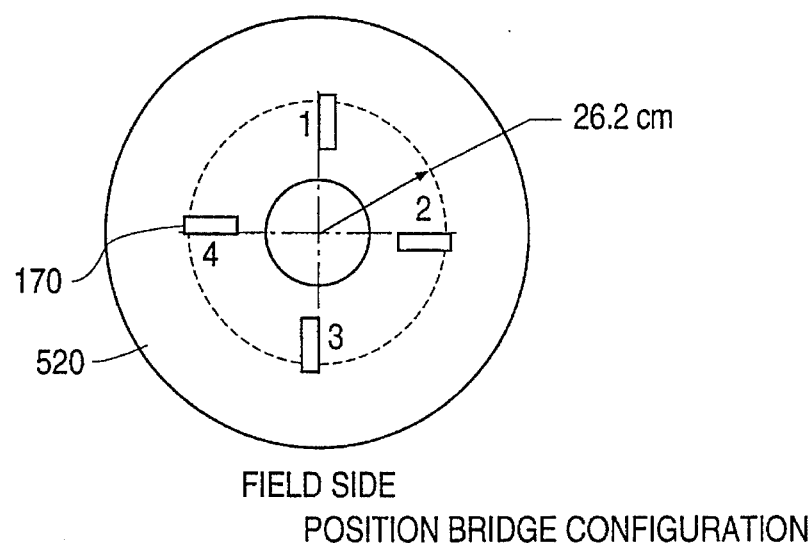
FIG. 15 illustrates a configuration of a contact position wheelplate sensor.

To determine the best radial location of the contact position sensors 170, the contact position sensor output was calculated at several radial locations on both field and gauge sides of the wheel. This process generates mappings similar to the strain maps used for the vertical and lateral sensors. Based on these mappings, the inventors have for example preferably fixed a radial location of 26.2 cm (10.3 inches) on the field side of the wheel. The contact position sensor output at this location is illustrated in FIG. 15. Contact position sensor sensitivity may vary from about 0.5 microstrain per kilopound for a contact point near the field side of the tread, to about 7 microstrain per kilopound near flange 40.

From FIG. 15, clearly the amplitude of the vertical load varies with contact position across the tread contact position. Although contact position sensor sensitivities are somewhat lower in new wheels, they improve with wheel wear.

To generate a constant output combined signal, again using a trigonometric relationship, four contact position sensors 170 may be spaced 22.5° apart. The angular spacing is half that for the vertical sensors, because the frequency of the position sensor output is twice that of the vertical sensors. The contact position sensor output inherently contains significant higher order harmonics. However, in practice the inventors have discovered that in the unique case of the contact position sensors 170, fewer sensors are required because ripple induced in the position signal contributes in only a secondary way to the overall recovery of force inputs. So, instead of the six sensors required to eliminate the fifth harmonic as indicated in Table 1, the inventors have found it possible to suitably implement four contact position sensors 170.

D. Longitudinal Sensor Placement

The longitudinal force (T) measurement is typically the easiest to make. A single torque sensor circuit may serve as longitudinal sensor 180 at the center of the axle can provide a constant output in response to longitudinal load, without much complication. Torque strain sensor sets are available commercially. Like the other sensors, the longitudinal sensors 180 are insensitive to changes in temperature and inertia. Furthermore, the longitudinal sensors have little or no cross sensitivity to vertical or lateral loads.

In terms of applying a gauged wheelset to an actual vehicle, brakes are usually disabled when instrumented wheelsets are used. Lie axle torque can therefore be related directly to the equal and opposite longitudinal forces at the wheel/rail interface. Error due to the resistance of roller bearings, wheelset rotational inertia, etc. is negligible.

For the case of locomotives or other powered-axle vehicles, a different method for determining the longitudinal force T may be required. Either the axle or the wheelplates can be gauged to measure the longitudinal forces at each wheel, depending on the locomotive. In such cases, each wheel must include separate strain sensors because the strain forces will not necessarily be equal and opposite.

FORCE RECOVERY

Once suitable strain sensor positions are developed through placement modelling and harmonic analysis, the forces acting on the wheelplate with sensors placed accordingly must be isolated. Four simulated sensor output signals for each wheel are used to solve the three force components (V, L and T) and the contact point (P) for the subject wheel, as modelled by a further finite element analysis. This process requires solving a system including three quadratic equations, for the three trigonometrically combined signals, plus a linear equation from the simpler output of the longitudinal sensor 180.

As shown in Equation 1, the sensitivity of the strain sensors typically depends on both the rotational position of the wheel ($\Theta$), and lateral position of the contact point (P). Despite this, the instrumented wheelset system of the invention can recover component forces without resort to any type of axle encoder. To achieve the accuracies required, the contact point (P) is computed at each data point.

To recover the component forces from the combined signals it is necessary to understand the relationships governing the output of the strain sensors. There are four unknowns including the three force components (V, L, T) and the lateral position of the contact point (P).

To solve the system of force recovery equations, a contact point (P) is first assumed at a specific location. The response of a strain gage bridge on the plate of the wheel to a load applied on the tread of the wheel can be expressed as a function of the position of the applied load and the vertical, lateral, and longitudinal components. For a given contact position (P), Equation 1 can be expressed as:

Equation 7

$$E = f(\Theta)V + g(\Theta)L + h(\Theta)T$$

In the case of the longitudinal sensors 180, the functions f and g are essentially zero, while the function h is essentially constant for all values of $\Theta$. This means that the longitudinal force T can be directly calculated by scaling the output of the longitudinal sensor.

For the lateral, vertical, and position sensors the sum-of-the-squares combined signal is independent of the rotational position $\Theta$. At an assumed P, the combined signals are of the form:

Equation 8

(A) $\Sigma_j E_j^2 = \zeta V^2 + \eta L^2 + \xi T^2 + \chi VL$ (B) $\zeta = \Sigma_i a_{iV}^2$ (C) $\eta = \Sigma_i a_{iL}^2$ (D) $\xi = \Sigma_i a_{iT}^2$ (E) $\chi = \Sigma_i a_{iV} a_{iL}$ The subscripts v, l, and t denote the Fourier coefficients of the wave form responses to vertical, lateral, and longitudinal loads respectively. The combined signal contains a mixed term due to the interaction of the vertical and lateral load responses. There are no interaction terms due to the longitudinal load, because it is 90° out of phase with the vertical and lateral loads.

Since T can be directly calculated, Equations 7 and 8 can be rewritten with only the unknowns V and L on the right. Using the combined signals from the lateral and vertical sensors corrected for the longitudinal load T, the system is reduced to two equations in two unknowns.

As will be appreciated by persons skilled in the art, these simultaneous quadratic equations may be solved by a variety of methods to obtain the values of the vertical and lateral load, again assuming a known contact position, P. The sign of the lateral load is determined by comparing the signs of the raw lateral sensor signals with those of the raw vertical sensors. The vertical load must always be positive, so the raw vertical signals are newer inverted.

To determine the actual position of the contact point P, this calculation is performed for several assumed contact positions across the tread 200. The expected value of the sum of the squares signal for the contact position sensors 170 is then calculated based on the computed vertical and lateral loads at each assumed position. By comparing the expected values of the contact position sensor signal with the actual contact position sensor signal, the actual contact position P can be determined, in essentially an interpolation process. Once the contact position P is determined, the actual vertical and lateral forces can be calculated.

ERROR ANALYSIS

Even once component forces are thoroughly computed in the manner described above, it is still necessary to identify any error in the calculated strain forces due to fundamental premises of the wheelset design. An error analysis module, which may run on a computer, is provided to read the sensor output waveforms, input known forces and contact positions, and calculate the actual vertical and lateral forces, and position. The error analysis module may use these waveforms as references, and interpolate for different positions across the wheel tread 200. Furthermore, the anomalous effects of two point contact between wheel and rail should also be examined.

A. Error Calculations

To do a rigorous error analysis, it is assumed that the strain sensors are identical and placed precisely on the wheelplate, and that the finite element analysis accurately captures the response of the sensors to applied forces. Given such a framework, the majority of the error is found to be due to ripple on the combined sensor output.

Determination of these subtler errors in the execution of a subject wheelset may be aided by a pair of dedicated computer programs. The first program, a gauge simulator module, calculates each strain sensor response due to any load and contact position history. The calculation is based on the finite element strain predictions and the various sensor configurations outlined above. The lateral load contact point may be specified at lateral or rotational positions other than those of the vertical load, to simulate conditions of two point contact, with or without an angle of attack.

A second computer program, an error processor module, accepts individual sensor outputs from the gauge simulator module and uses the force recovery equations to compute forces and lateral contact position P. The force recovery equations (e.g. Equations 7 and 8) assume a single point of contact P. The error processor module always computes a single lateral position, even under two point contact.

In both modules, a basic error analysis is first conducted. Constant levels of vertical, lateral, and longitudinal loads are assumed over a travel distance of one complete wheel revolution. The gauge simulator module may run for T/V ratios of 0, 0.25, and 5 and for a −0.5 to +2.0 L/V range. Loading conditions may be repeated for three lateral positions: a flanging case in which loads are acting at −1.7 inches from the tape line, at the tape line, and on the tread at 2 inches from the tape line. The error processor module may then be run for all load cases. Errors are computed from the difference between assumed and predicted load levels, for instance as percentages of the constant base vertical load.

Figure 16:
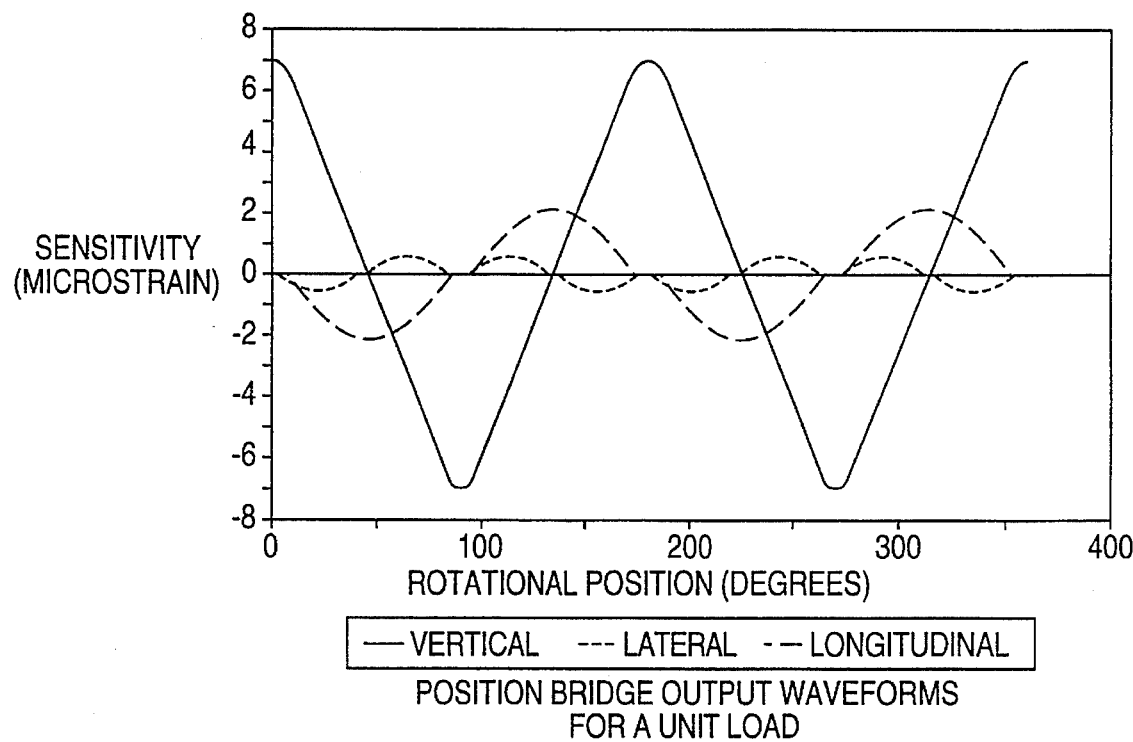
FIG. 16 illustrates a graph of contact position sensor output versus rotational position.

FIG. 16 shows a plot of the errors in the lateral and vertical loads for the flanging case only. The maximum lateral load error is 0.3% while a 1.0 percent maximum error is seen in the vertical load. Lateral load errors are virtually the same for the tape line and tread cases (not shown). Errors in the vertical load decreased as the contact point P moved away from the flange 40, with a maximum value of 0.4 percent when the contact point was at the tread 200.

For the flanging case, sensors vertical load crosstalk into the lateral cancels their sensitivity to lateral load. The result is a near zero lateral sensor output which slightly reduces the mapping accuracy of the force recovery equations. This however is not a singularity and that the system of equations remains bounded but slightly less accurate. The L/V ratio which causes such conditions changes to about 0.2 at the tape line and 0.3 out on the tread 200. For these two conditions, the overall error in the lateral load is below 1.0% while a 0.5% error is seen in the vertical load.

B. Two Point Contact

Figure 17:
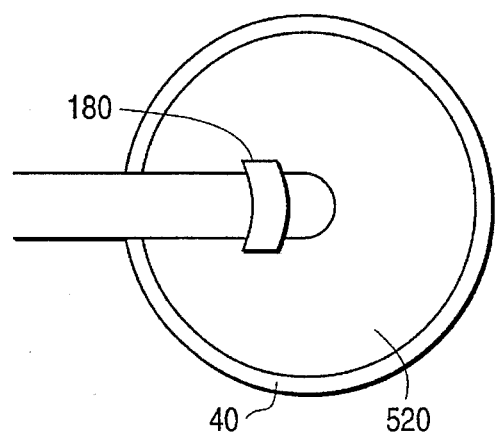
FIG. 17 illustrates a configuration of a longitudinal sensor.

An abnormal case may occur when a rolling wheel moves laterally, changing its contact with the rail head from a single point to two points. The variation in contact depends on both wheel and rail profiles and the lateral position of the wheel with respect to both rails. FIG. 17 illustrates the contact conditions for typical wheel and rail profiles; note the two contact positions resulting from the gauge side of the rail being in contact with the wheel flange 40.

Figure 18:
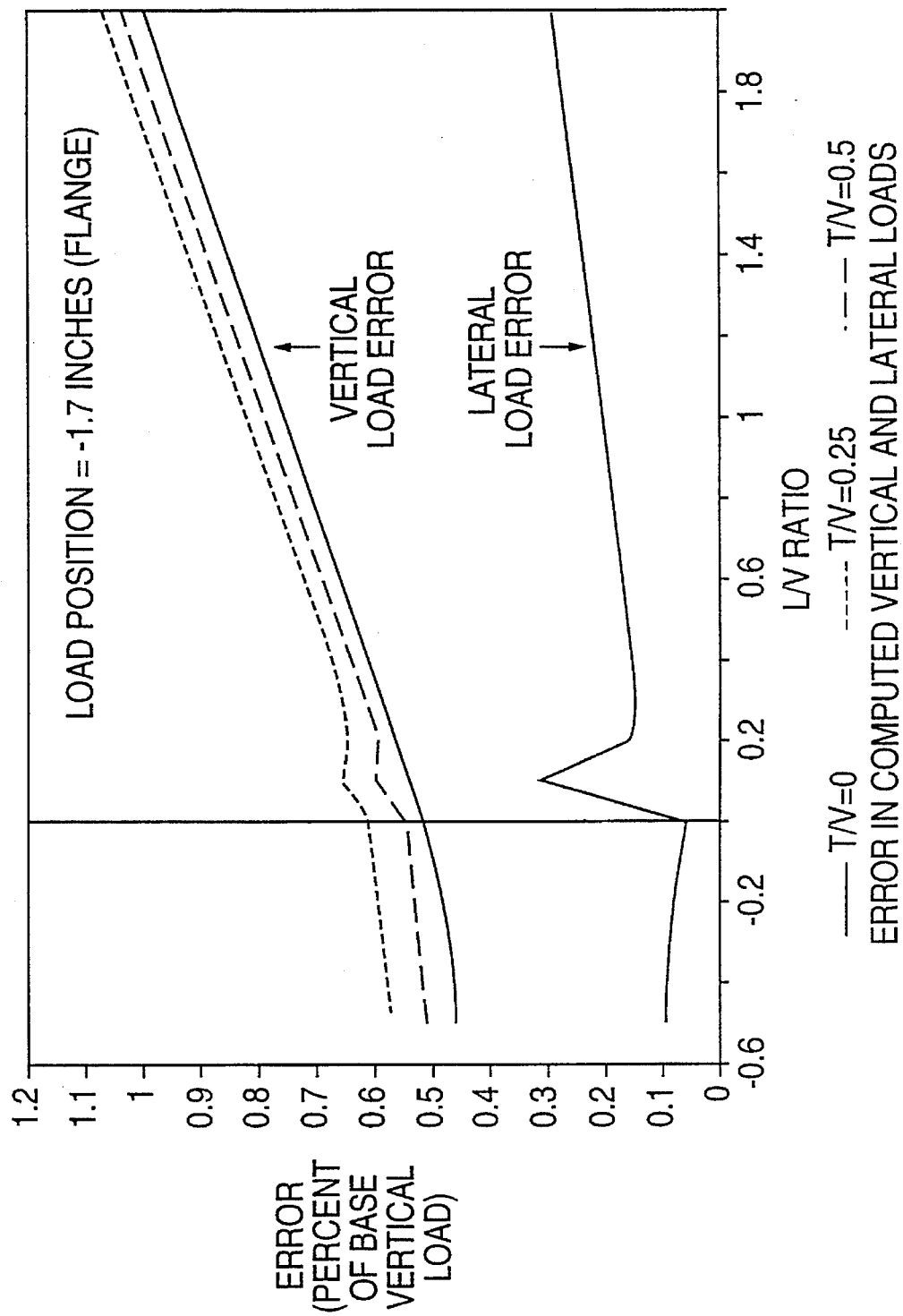
FIG. 18 illustrates a graph of errors in computed vertical and lateral loads.

An example of two point contact output distortion is illustrated in FIG. 18, showing the lateral position of both vertical and lateral force components. In this example the wheel is moving from a single point of contact at the tape line to a two point contact, and then to a single point of contact on the flange. The magnitudes of the vertical and lateral forces are shown in FIG. 19.

Figure 19:
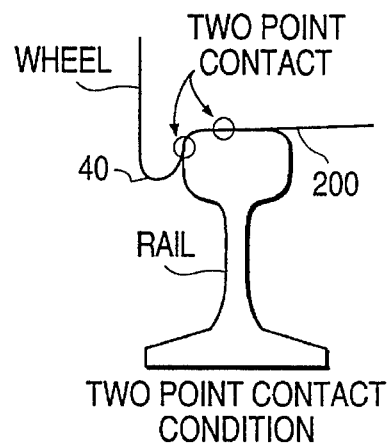
FIG. 19 illustrates the mechanical dynamics of the two contact point condition.
Figure 20:
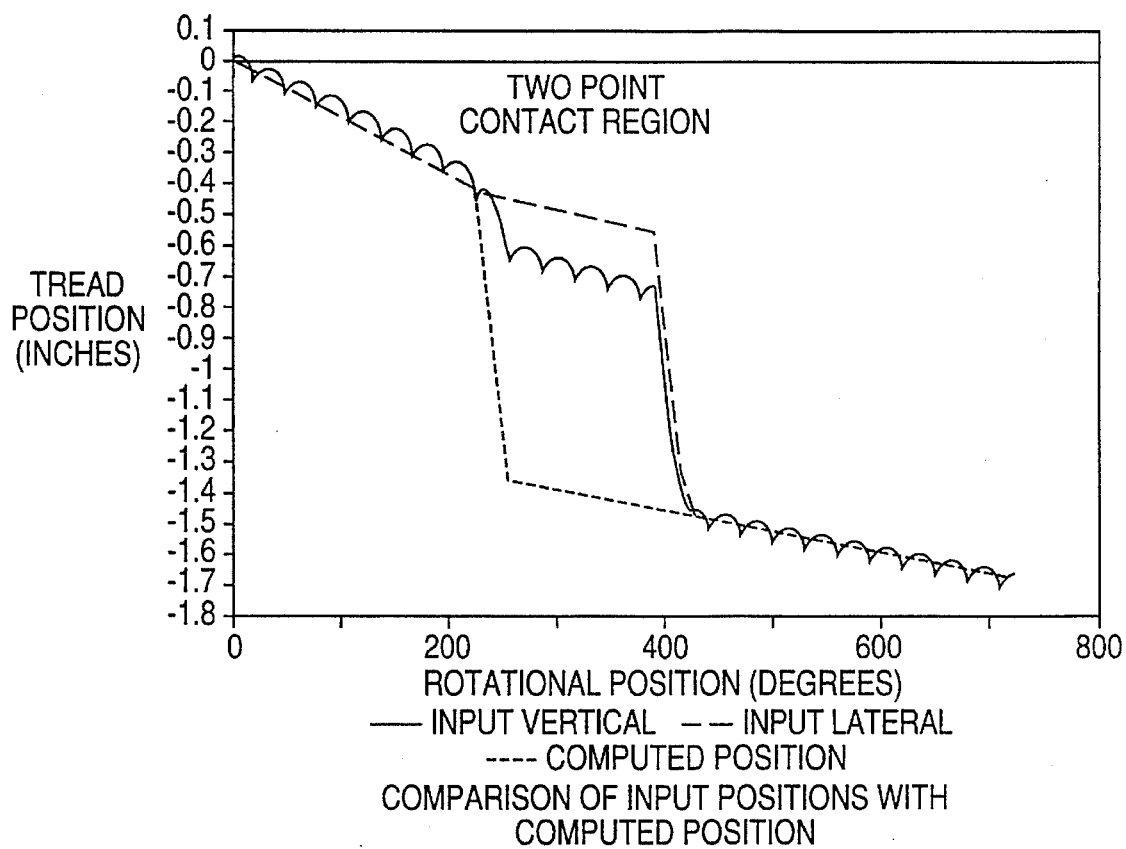
FIG. 20 illustrates a graph comparing input positions and computed positions at various tread contact points (P)
Figure 21:
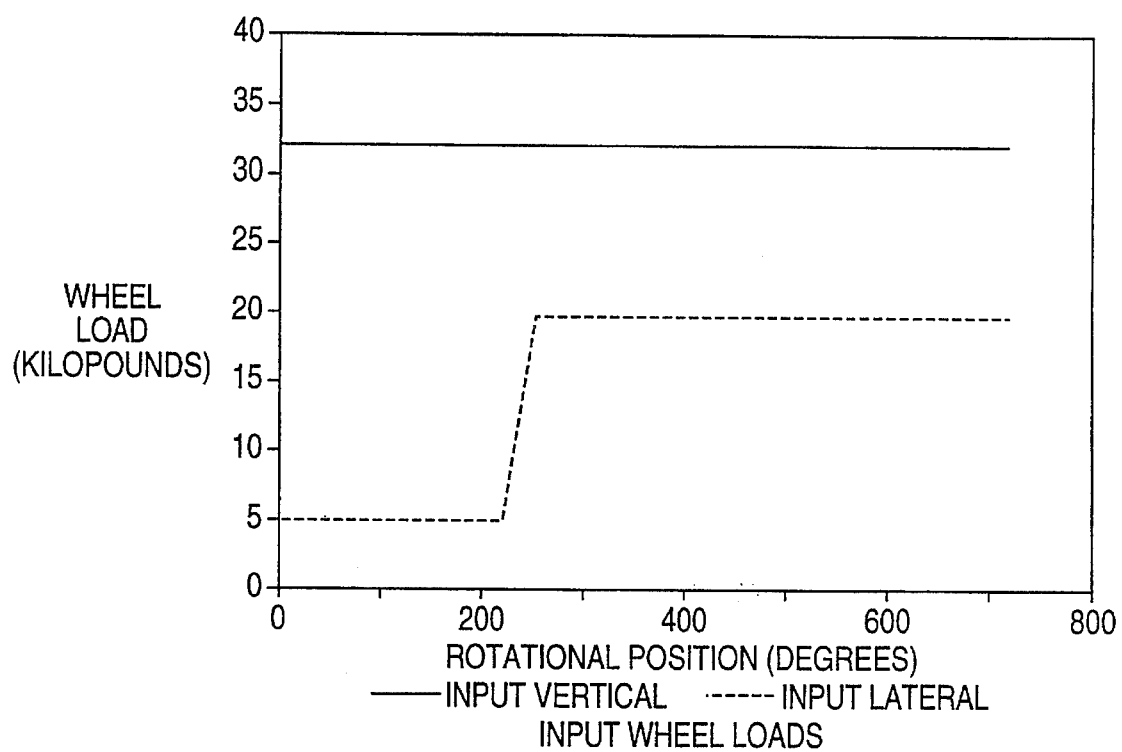
FIG. 21 illustrates a graph of wheel loads as a function of rotational position (Θ)

Note from FIGS. 17–19 that while the vertical load is assumed to remain constant, the lateral load increases as the wheel flange 40 makes contact with the gauge side of the rail. FIG. 18 also shows the predicted contact position. Also, in the domains of single point contact, the predicted position matches well with the actual position. In the domain of two point contact, the predicted position becomes biased toward the actual vertical load position.

EXPLORATORY GAUGING

Once the three force components and contact point are determined and subjected to a thorough error analysis, a physical exploratory loading may be performed on the completed subject wheelsets. The exploratory loading may be done using gradient strain gauges 190 mounted at the positions specified for each of the sensors. Gradient strain gauges 190 may be of strip type, containing as many as 10 gauges per inch. Gradient strain gauges may be purchased in commercial form, for example Part EA-XX-031MF-120 made by Micro Measurements Corporation. The inventors have for instance have used gradient gauges separated by 0.2 cm, centered as close to target sensor position as possible.

To carry out exploratory gauging, which is in the nature of a confirmation, several vertical and lateral loading sequences may be performed at various positions across the tread 200. The resulting data may be compared to the finite element placement modelling predictions, to make any adjustments to vertical sensor position and hence optimize sensor output.

However, the output produced by strain sensors positioned according to the (finite element) placement modelling has been found to be very accurate, even after examination using gradient gauges. Any necessary adjustments to target sensor positions have therefore been slight.

The inventors have carried out all of the above modelling and gauging process and construction. Completed vertical, longitudinal latitudinal and contact position sensors have been accurately installed, to within 0.01 cm of the specified radial position on the wheelplate. Gauge zero balance to within + or −2 mV/V has subsequently been achieved. Gauge zero drift, due to temperature fluctuation, of less than + or −50 microvolts/V/° F from 0° to 100° F has likewise been achieved.

After exploratory gauging has been carried out, it is possible to carry out a second error analysis like that done on simulated sensor output from target positions, to even better enhance accuracy.

CALIBRATION FIXTURE

Figure 22:
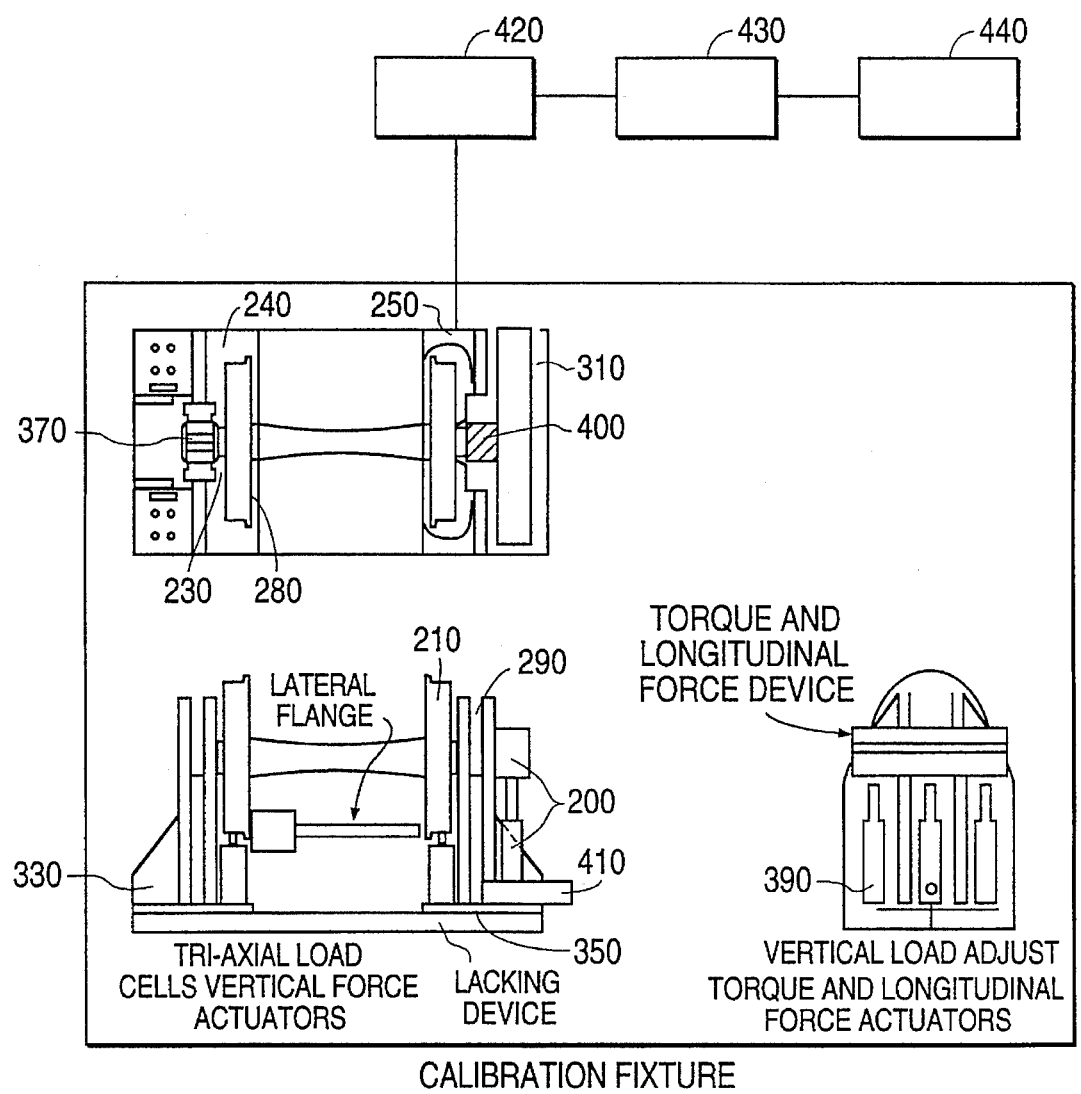
FIGS. 22, 22(A) and 22(B) illustrate a calibration fixture for mounting and calibrating an instrumented wheelset.
Figure 22A:
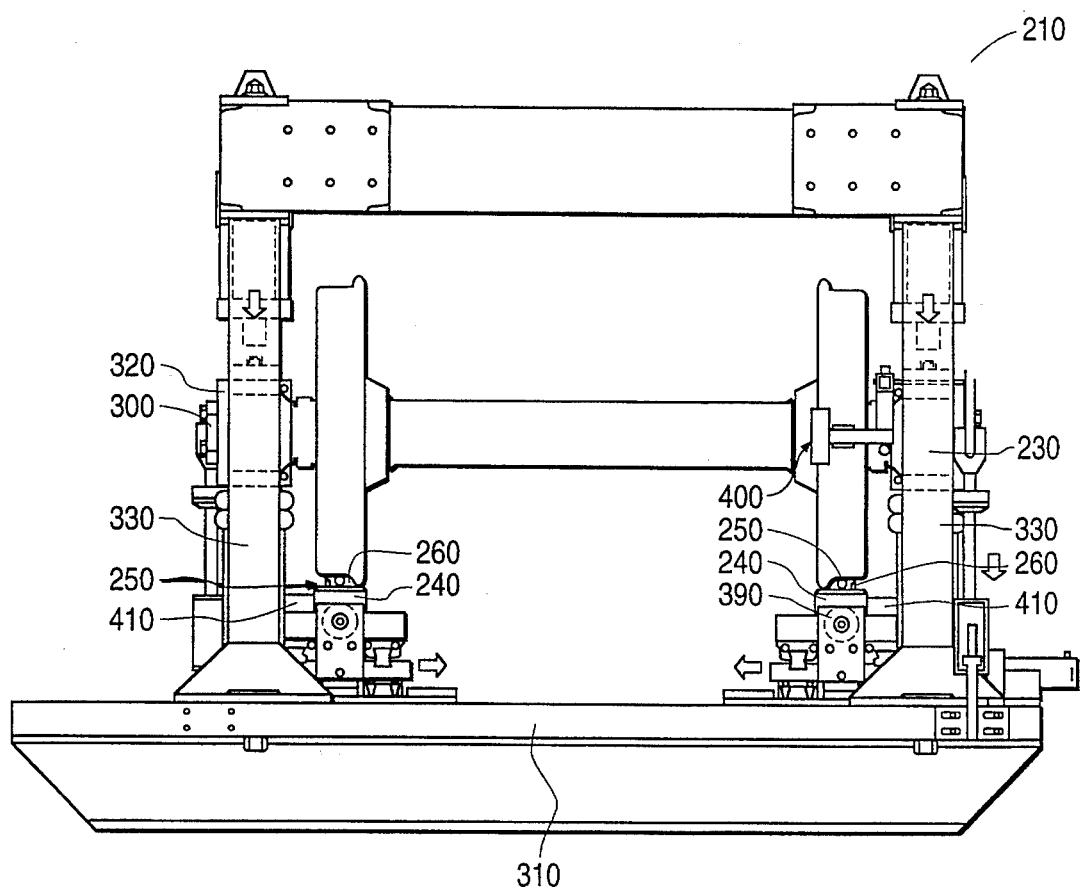
Figure 22B:
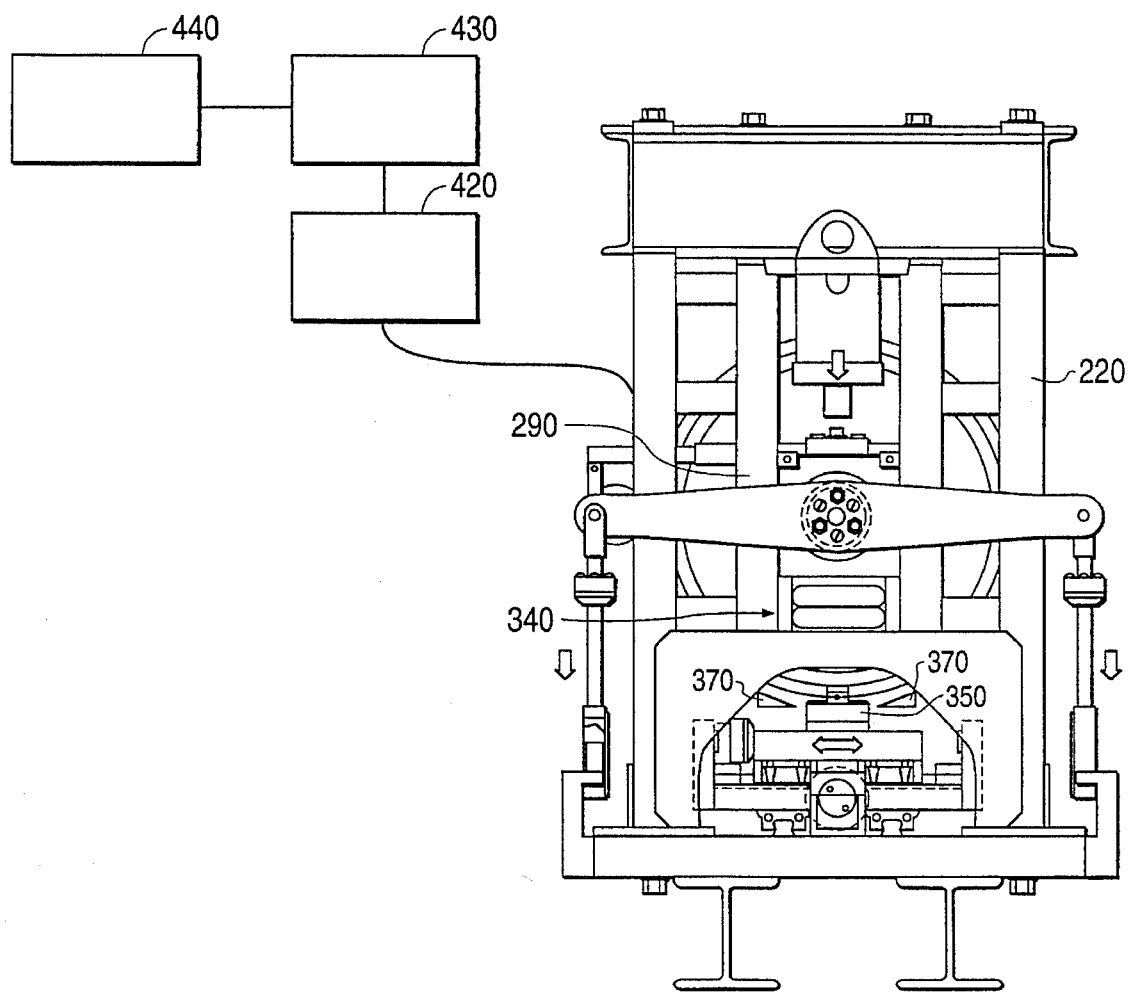

To secure the exacting accuracy (approximately 2 percent of static wheel load) of the instrumented wheelset system of the invention, even after placement modelling, force recovery, contact point and other error analysis, and any exploratory loading, a highly accurate calibration is preferably performed to eliminate even small errors. To perform this calibration, the invention makes use of a static load inducing calibration fixture 210, illustrated in FIGS. 22(A) and 22(B), capable of loading accuracy to within approximately 0.1% of static input load.

The frame 200 of calibration fixture 210 is reinforced to limit structural deformation to within small tolerances. Large supporting members with high moments of inertia, gussets and a thick base plate bolster the frame 220. By limiting any deformation of frame 220, calibration accuracy and repeatability may be improved by orders of magnitude over previous designs.

Unlike simple jigs of previous designs, the calibration fixture 210 must be capable of delivering load forces into completed instrumented wheelsets in all three directions-vertical, lateral, and longitudinal, and at a variety of tread positions, even the tip of the flange. The calibration fixture 210 must be able to apply a pure vertical or lateral force to a subject instrumented wheelset, as well as a combination of vertical and longitudinal forces, in as little as 2° angular increments, or less. Output from calibration fixture 210 can be used to determine the sensitivity (f, g and h) functions of the force recovery equations, to ensure accurate wheelset data from live loads. At least two data points must be collected to perform a satisfactory calibration. One is under zero load case, and the second is under load. For classical calibration, a change in applied load should be proportional to the induced change in surface strain. Simply subtracting the loaded signal from me unloaded signal provides the delta load and delta strain, and an accurate calibration factor can be developed.

But physical phenomena, including structural deformation, friction, wheelset mass, reaction forces, etc. must be accounted for to ensure best calibration accuracy. Any misalignment of the load frame 220 obviously can cause vector loading. Also, to avoid bending of the linear bearings 230 due to surface deflection under load, loading surfaces 240 are preferably made significantly thicker to minimize any deflection.

To further enhance structural integrity, the calibration fixture 210 includes a custom loading round 250 seated in a custom seat 260. Loading round 250 is intended to prevent settling due to placement on soft material, and begins as a mild steel which is then press cut with a cut section of a wheel. Loading round 250 also gets a contact spot pressed into it. Once contact that spot is of a satisfactory geometry, loading round 250 is hardened to a hardness slightly exceeding that of the wheelset. A suitably hard placement member is therefore provided.

Frictional forces can also detract from calibration accuracy, and should be minimized or quantified, particularly in the linear bearings which must allow for lateral and longitudinal movement of the loading surface. Other frictions may develop between the bearing blocks 290, axle bearings 300 and the frame 220 itself. To remedy such frictional corruptions, the coefficient of friction of the bearings 300 was measured as 0.002–0.003, which the inventors deemed acceptable. During calibration the load frame table 310 must be kept as close to level as possible, since inclination increases the coefficient of friction in the inclined direction. Furthermore, the axle bearing boxes 320 use the two side piers 330 as guide ways, so frictional force will ensue if these piers are not well aligned. While less important to calibration accuracy, this can hamper operation of the calibration fixture is hampered since among other things pneumatic air bags 340 will not operate smoothly.

Frictional corruption in the axle bearings 300, bearing blocks 290, and between the bearing blocks 290 and the frame 220 may be treated by quantifying the frictional load losses through load cell redundancy.

The calibration fixture 210 may actually measure loads using transducers, such as triaxial load cells 350. As an alternative, three perpendicularly aligned single-load cells may also be used. Load cell interconnection is by high-quality shielded cabling, to reduce extraneous noise. The triaxial load cells 350 may preferably comprise four vertical load measuring load cells (2 per side), 2 longitudinal load cells (1 per side) and two different techniques for lateral calibration. Multiple load cells lying in the same load plane simply serve as checks on each other.

The calibration fixture 210 itself is configured to apply large vertical forces of up to 50,000 pounds (227 kN), for example by pushing down on the wheelset at tie axle journals 360, and reacting the wheelset with triaxial load cells 350 at the wheel/rail interface point. The triaxial load cells 350 indicate any lateral or longitudinal forces that occur when applying a pure vertical force, to aid in determining crosstalk errors, and are preferably located laterally underneath the wheelset, at positions independent of each other. The calibration fixture 210 may also be provided with indexing fingers 370, to accurately locate the load cells under the wheel to obtain repeatable load points laterally across the wheel tread. The contact point (P) on the tread can also be varied, to examine effects of contact position with respect to vertical load.

Figure 23:
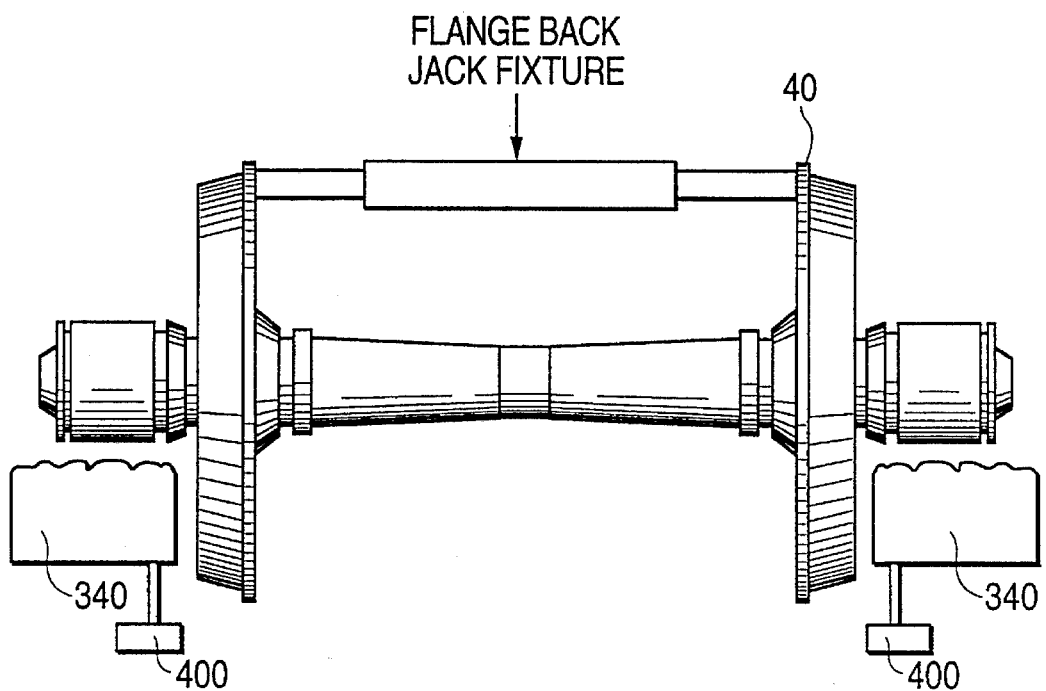
FIG. 23 illustrates a flange back jacking calibration operation, and hoisting air bags.

The calibration fixture 210 may apply large lateral forces of up to 25,000 pounds (114 kN) to the inside rim 380 using one of two flange jacking techniques. The two techniques, "negative lateral" and "positive lateral" loading, are quite different, but are designed to yield consistent results and hence act as a check. Negative lateral (or "flange back") loading is a simpler technique using a hydraulic cylinder fitted between the wheels, and presses the wheel flanges 40 towards their respective field sides to create a negative lateral bending force, as illustrated in FIG. 23.

The positive lateral technique produces a lateral bending force of comparable signal magnitude, but positive instead of negative. In the positive lateral technique, a secondary vertical load is also applied to hold the wheelset in place while the load is being applied, creating friction at the load point of the cell. A positive lateral load is also applied at the tables that are on the linear bearings below the wheelset by pressing the wheels in toward their respective gage sides. The resultant signals are processed so to remove the vertical component, leaving only the lateral component.

The calibration fixture may apply a large longitudinal force up to 25,000 pounds (114 kN), by delivering a vertical force to one wheel and while lifting the opposite wheel slightly. The wheelset is then torqued with equal and opposite forces from servo-controlled actuators 390 at the lifted-wheel end to produce a longitudinal force in the opposite wheel. The wheelset is lifted by air bags 340 mounted beneath the bearing blocks on the end of the axle, as illustrated in FIG. 23. Because these air bags were not synchronized, one wheel would contact its load point before the other and causes the loading platforms to move on their linear bearings. This would result in an inaccurate placement of the load point on the wheel tread and disturb the calibration results. Pneumatic flow control valves 400 synchronize the lifting action of air bags 340, to synchronize the time contact is made with each wheelset. Lateral loading surface displacement when the wheels are close to synchronization is typically about 0.013 inches.

Another combined loading technique may be used to calibrate the wheelset for longitudinal crosstalk. All of the strain sensors on a wheelset are affected by longitudinal forces. The ability of the calibration fixture 210 to apply multiple axis loads allows accurate processing and extraction of longitudinal effects. Effects of longitudinal forces must not be ignored if highest accuracy is desired.

A maximum ratio of longitudinal to vertical force is about 50% using this technique, due to the coefficient of static friction between the wheel and triaxial load cell 350. The triaxial load cells 350 again can measure longitudinal and vertical loads at the same time. Along with the triaxial load cells 350, the actuators 390 themselves may have instrumentation to verify force and displacement of the wheelset.

An example of commercially available triaxial load cells is Part MCS-X-50000 made by Advanced Mechanical technologies, Inc. of Newton, Mass. Examples of alternative single-axial load cells to be perpendicularly combined are Parts 1210AF, 1220ALF/ALD, and 1320ALD made by Interface, Inc. of Scottsdale, Ariz.

Implementing load cells are preferably selected to measure the vertical loads had a useable range up to 50,000 pounds, with a static error band of approximately 0.03% full scale (15 pounds at applicable loads) and good resistance to crosstalk. The error is extremely small with a "true" vertical load applied. If side (vector) loads are added, the error increased to approximately 0.1% full scale (up to a 40% side load).

Implementing lateral load cells are preferably selected to have similar characteristics to those employed for the vertical load plane, except for full scale range which is 25,000 pounds. The lateral cells exhibit the same static error band as the vertical cells, approximately 0.03% of full scale (about 7.5 pounds at applicable loads).

For the longitudinal and axle torque load cells, the same two 5,000 pound full-scale cells may be used for both calibrations. The static error band of these two load cells was approximately 0.017% (0.85 pound as applicable load). Clearly, high-quality load cells contribute to good accuracy in calibration fixture 210.

Wheelset rotation while mounted on the calibration fixture 210 can be done by hand using an axle encoder 400 to monitor radial displacement, for instance in 2° increments. The axle encoder 400 may for instance be a 16,000 count/revolution quadrature encoder using a 6 inch diameter wheel that contacts the flange of the wheelset. This yields a resolution of 0.00062° per count on a 33" wheelset. This represents a high accuracy margin over the loading hardware accuracy of 0.1%. However this margin allows for the mechanical clearances of the bearing block 290 with respect to the bearing, and the bearing block 290 to the frame 220. These clearances reduce the frictional forces which may corrupt a calibration, even though they tend to inhibit rotational position accuracy.

The use of indexing fingers 370 to position the triaxial load cells and axle encoding of rotational position make the calibration procedure highly repeatable. Also, with respect to position of the contact point between wheel and rail, it is known that the strain forces on the wheelplate changes significantly when the point of contact varies from the field side of the tread toward the gauge side, and anywhere in between. The calibration fixture 210 consequently uses digital scales 410 connected to loading surfaces to measure the exact contact position. Commercially available digital scales can be used, such as Part JS5045 made by Sokkisha Corporation, preferably capable of measuring within 0.0002 inches of lateral or longitudinal displacement.

The calibration fixture 210 is straightforward to operate and easy to maintain, and can apply a wide range of any of the three component forces. Moreover, due to the robustness of the design, the calibration fixture can be used, or readily adapted to be used, to calibrate a wide variety of wheels, including those with differing widths, axles, and inboard bearings.

The accuracy of the calibration fixture design has been checked by finite element analysis techniques. Those integrity models have revealed that displacements were limited to approximately 0.1 cm under a 50,000 pound vertical load, small enough to not affect the wheelset calibration. The load measuring techniques are a significant part of the calibration fixture, and the higher their accuracy the better. The inventors have as an example successfully achieved calibration accuracy of within 1/10th of full scale loading (using single-axle loading cells perpendicularly arranged).

Due to the high accuracy of calibration fixture 210, attention must be paid to intelligent collection of fixture output data. The calibration data acquisition system includes axle encoder 400, load cells 350, and digital scales 410 as the only three types of transducers connected to the calibration frame. Remaining signals (which may total 20 or more channels) flow from the strain sensors on the wheelset itself. A calibration data acquisition unit 420 may be used is manufactured by Hewlett Packard Corporation and is capable of handling the "front-end" task of data digitization and collection. Part HP3852 made by Hewlett Packard Corporation may be suitably used as a calibration data acquisition unit 420. That part has 44 high level input channels feeding a 13-bit A/D converter, and may be controlled by a host computer via an HPIB interface.

Because the load cells 350 installed on the calibration fixture 210 may provide low level signals, an amplifier 430 may be desirable to amplifier load cell output before passing on to calibration data acquisition unit 420. An Ectron Corporation Model 418 strain gauge amplifier may for instance be suitably attached to every load cell channel. Some sort of adjustable gain on amplifier 430 is preferable to use the entire range of A/D converters in the calibration data acquisition unit 420 so that maximum signal resolution can be obtained. A shunt calibration control on amplifier 430 is also preferable to help calibrate out system gain errors.

Calibration data acquisition unit 420 may be controlled by a calibration control computer 440, to read the rotary position from the axle encoder 400, and to read the contact position from the digital scales. Calibration control computer 440 may for instance be an IBM Corporation Personal Computer or compatible, and use expansion and other buses for (serial or parallel) communication with data acquisition unit 420.

Calibration Example

The following is an example of the calibration operation, assuming a wheelset producing the response indicated to the following loads.

| Unloaded Data Point | |
|---|---|
| Upper Load Cell | 0 pounds |
| Lower Load Cell | 1,500 pounds |
| Vertical Strain Gauge Bridge | −100 microstrain |
| Loaded Data Point | |
| Upper Load Cell | 39,750 pounds |
| Lower Load Cell | 41,500 pounds |
| Vertical Strain Sensor | +380 microstrain |
| Calibration factor using upper load cell: | |
| $(398 - (-100)) (39,750 - 0) = 0.01253$ microstrain/pound | |
| Calibration factor using lower load cell: | |
| $(398 - (-100)) (41,300 - 1,500) = 0.01200$ microstrain/pound | |

This example illustrates the possibility of reaching two different results for the same loading. The correct one uses the lower load cell, because it is closest to the actual contact point between wheel and rail. When a zero load is collected, the load cell beneath the wheel (lower load cell) will show the weight of one wheel and half of the weight of the axle. In this example, this weight is equal to 1,500 pounds. The upper load cell shows a change in load of 39,750 pounds, but the lower load cell is showing a change in load of 40,000 pounds. This is an error of 4.4%.

DATA ACQUISITION

Once an instrumented wheelset (comprising two wheels mounted on an axle ) is assembled and strain sensors 10 are properly and accurately installed, an error analysis and exploratory gauging done, and calibration performed, the wheelset may be mounted onto a vehicle for live testing and use. The instrumented wheelsets may be mounted on axles drilled to accommodate wiring harnesses, slip ring assemblies and other equipment for easy gauge and instrument installation.

The strain sensors 10 produce electrical signals which may be captured and converted to digital form for use in a computer. The inventors consider the accurate generation, collection and processing of data to be a basic and integral aspect of the instrumented wheelset system of the invention.

As illustrated in FIG. 24, in practice, the instrumented wheelsets may be fitted with electronic amplifiers 450, slip-ring mounted on the ends of the axles 460. The strain sensor output is therefore detected and subjected to a gain, for example up to 55 dB, before delivery to further parts of the data acquisition system. The data acquisition system includes a computer 470, which may be installed in a cabin car separate from the vehicle riding on the instrumented wheelset. A computer such as an IBM Corporation reduced instruction set machine (for instance RS6000 Model 320) running under a version of the UNIX (Trademark) operating system has been suitably employed, but of course a variety of other computing machines could be used, including special-purpose processors, as illustrated in FIG. 24.

For quantification of the strain sensor signals 480 delivered from the axle end-mounted amplifiers 450, analog-to-digital converters 490 are used. Sixteen bit A/D converters are very suitably employed. Sixteen bit resolution ensures at most 0.0031 percent amplitude error due to digitization, and may be preferably used (although digitizers as low as 11 or 12 bits could also be adequately employed). For instance, digitizer Model ADC488I8S by IOTech Corporation, a sixteen-bit part, may be used for analog-to-digital converters 490. That particular sampler is an eight channel simultaneous sample and hold part, which ensures a slewing time of at most 60 nanoseconds between channels.

The output of A/D converters 490 is routed through an appropriate interface 500, such as an IEEE 488 bus, to computer 470. The inventors considered the collecting, storing, and processing of the strain sensor output as a significant part of the invention. Because of the harmonic method used for force recovery, strain values do not intimately depend on the accuracy of individual sensor outputs. This relaxes the necessary sampling rate for individual strain sensors. In fact, in the invention the strain sensor outputs need only be sampled at a rate required to accurately capture the dynamic range of the wheelset input. Frequencies of 15 Hz and below are usually of interest, so 30 samples/second should satisfy the Nyquist criteria.

However, a sampling rate of 30 samples/second yields little amplitude information. To capture the dynamic range of amplitude input, the sampling rate should preferably be set at approximately 20 times the highest expected dynamic frequency. The IOTech Corporation A/D converters mentioned for instance support a sample rate at 400 Hz, yielding 99.45% accuracy in the peak amplitude of the dynamic range, a very satisfactory level.

Besides collection, real time display and storage of computed wheel/rail forces gathered from amplifiers 450 through bus 500 and A/D converters 490, monitoring computer 470 also performs intelligent monitoring of the strain sensor outputs to ensure integrity of each. As described above, using the strain sensor installation methodology of the invention, four vertical, one longitudinal, two lateral and four positional sensors may be used, yielding approximately 22 total of channels in data channels 520.

As will be appreciated by persons skilled in the art, in any one of those channels, a number of possible corruptions could occur:

Open Channel: A cable, connector becomes detached, frayed or otherwise broken. Monitoring computer 470 then samples open channel noise.

Shorted Channel: A cable, connector or other electrical component gets shorted to ground. Monitoring computer 470 then samples an essentially zero signal, or noise downstream from the ground point.

Intermittent Connection: An erratically open or shorted channel produces normal data interspersed with noise.

Induced Noise: RF or other interference picked up through an improperly shielded transducer, cable or other component.

Malfunctioning Wheelsets: One or more of the strain sensors break down.

Malfunctioning Ancillary Equipment: Drift, gain, distortion or other problems in amplifiers 460, bus 500 or other components.

The instrumented wheelset system of the invention provides monitoring computer 470, which may be programmed to operate interrogation modules 530 to identity these types of problems, as illustrated in FIG. 24. Monitoring computer 470 may be run under a monitoring module 540 which coordinates raw wheelset output, and stores channel data in a region of shared memory accessible by interrogation and other modules. A neural network module 550 may be trained to recognize the waveforms from a given instrumented wheelset, and help carry out the interrogation. A display module 560 is also preferably provided to displays data to a screen in real-time. A disk manager module 570 is provided to manage reads from shared memory areas 620, and writes to disk 610 or other storage. Examples of computer code suitable to carry out programmed software aspects of the invention, including those of monitoring computer 470, are shown hereinbelow.

Monitoring computer 470 is also preferably provided with a real-time processor module 580, which calculates the component forces at the live wheel/rail interface for inspection by a test operator. Monitoring computer 470 produces another area of shared memory to store the actual forces produced by the realtime processor module. All modules running on monitoring computer 470 have access to this realtime data, just as the raw channel data. Monitoring computer 470 reads all calibration constants and coefficients, shunt calibration values, and performs calculations to determine the component forces as a test vehicle rolls along. Monitoring computer 470 may also run a filter modules to filter any force data above a predetermined cutoff frequency, supplied by the test operator.

Monitoring computer 470 or other remote computers may also run a stand-alone processor module 590, which functions like the real-time processor module except that performs calculations from raw data saved to disk, after live testing.

Monitoring computer 470 running suitable interrogation, real-time processing and other modules may display simple raw channel signals for the user when the corruption can not be identified. The display module 560 may for instance display channels grouped by function along the vertical axis with time as the horizontal axis, and amplitude represented by color on display screen 510. In terms of implementation of interrogation algorithms, each of the samples produced by A/D converters 490 may be converted into the frequency domain using a Fast Fourier Transform (FFT), which will be familiar to persons skilled in the art.

For better sampling accuracy of low frequency behavior of the channels 520, a number of cycles of a waveform should be sampled. Given a 400 Hz sampling rate, to compute a 1024 point FFT, a conventional size, of each channel 520, approximately 2.5 seconds of data must be collected.

The FFTs of those samples of that duration can then be manipulated to attempt to identify the presence of corruptions. The FFTs may for instance be used to compute pairwise correlation functions for all possible channel permutations, or to identify abnormal frequency components.

For example, given four vertical channels per wheel, a pairwise permuted correlation matrix can be defined as:

$$\begin{vmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{vmatrix} \quad \text{Equation 9}$$

The permuted correlation matrix is symmetric. Autocorrelation functions appear as diagonal elements. Cross channel correlation functions have maximum values at $\delta$ times 45°, $\delta$ representing the difference between subscripts of the terms in the correlation matrix.

Particular techniques can be directed to identifying particular types of corruptions. An open channel for instance may exhibit telltale signatures revealed by FFTs. Frequently the sampled potential of an open channel is a "ghost" of other channels, due to faint adjacent emissions. This type of open-channel corruption can be identified by examining the nondiagonal elements in the correlation matrix. A nondiagonal element with a maximum at zero delay is a strong indication that the two channels contain the same (or very similar) signals. This can be verified by examining the individual FFTs for the open and adjacent channel to see whether the dominant peak coincides with the strain sensor fundamental frequency. Further verification may also be performed to ensure that some other form of corruption, for example 60 Hz noise from an unshielded generator, is not swamping the primary signal, again under the control of interrogation algorithms.

The interrogation modules 530 may notify the operator that a corruption corresponding to an open channel exists. By examining other nondiagonal elements containing one of the suspect subscripts, a logic table can be used to identify the particular corrupted channel. Other types of noise induced into an open channel can also be intelligently dealt with.

Other interrogation techniques can be used to detect other types of corruption. A shorted channel for instance exhibits an FFT that is substantially different, particularly including a strong DC bias, from other similar channels for long time periods. If those differences persist for several FFT cycles, there is a strong possibility of a shorted channel.

The channel corruption of intermittent connection in contrast is more difficult to reliably identify, because possibly causes are more than one. If the intermittent channel is caused by an intermittent short to ground, the rapid drop to zero should yield substantial high frequency energy. Conversely, if the channel becomes intermittently open, general noise phenomena may be seen. Because intermittent channel output essentially oscillates between two states, high frequency energy may help to distinguish this corruption.

Induced noise as another corruption may be indicated if the channel output is steady state and uncorrelated. Generator noise, a common source of corruption, will for instance appear at the same time across all channels. If the noise/data amplitude ratio is significant, it should be possible to identify that noise through the ratio (zero delay bin) of the diagonal to the nondiagonal elements of the correlation matrix.

With regard to malfunctioning wheelsets themselves, accurate modelling and calibration enables the identification of particular frequency ratio signatures produced by a properly operating strain sensor. If a strain sensor as a whole malfunctions, for instance because of a short on the wheelplate or a physical impact on the wheelplate, the frequency ratios can indicate which strain sensor's output is missing.

If amplifier corruption is suspected, bias drift on an amplifier can be identified by the presence of low frequency energy over the course of several FFT cycles.

The foregoing description of the instrumented wheelset system of the invention is illustrative, and variations on certain aspects of the inventive instrumented wheelset system will occur to persons skilled in the art. The scope of the invention is accordingly intended to be limited only by the following claims.

We claim:

1. A system for producing an instrumented wheelset including strain sensors for measuring strains on the wheelset, comprising:

profiling means for determining and storing a profile of a subject wheelset;

first modelling means for modelling dynamic behavior of the subject wheelset using the profile and simulated loading data, and outputting and storing first wheelset data;

second modelling means for receiving the first wheelset data as input and determining target positions for a plurality of orthogonal strain sensors using the first wheelset data;

third modelling means for providing a simulated output of the strain sensors positioned at the target positions, and adjusting the target positions if the simulated output deviates from a threshold by a predetermined amount;

calibration means for calibrating the plurality of strain sensors installed on the subject wheelset at the target positions according to predetermined loading conditions; and data acquisition means for receiving sensor output data from the plurality of strain sensors and selectively isolating undesired corruption.

2. A system for producing an instrumented wheelset according to claim 1, wherein said data acquisition means comprises:

compute means for receiving the sensor output data and processing the sensor output data to output and store wheelplate strain force data.

3. A system for producing an instrumented wheelset according to claim 2, wherein said data acquisition means further comprises:

amplifier means for amplifying the sensor output data;

first connection means for operatively connecting said amplifier means and compute means; and digitizing means for digitizing the sensor output data and providing the digitized sensor output data to said compute means.

4. A system for producing an instrumented wheelset according to claim 1, wherein the strain sensors comprise Wheatstone bridges.

5. A system for producing an instrumented wheelset according to claim 1, wherein said first modelling means comprises a programmed digital computer for performing a finite element analysis of the wheelset.

6. A system for producing an instrumented wheelset according to claim 1, wherein said second modelling means comprises a programmed digital computer for performing a simulated loading of the wheelset using impulse representations of unit loads.

7. A system for producing an instrumented wheelset according to claim 1, wherein said third modelling means comprises a programmed digital computer for performing a simulated output of the strain sensors installed on the wheelset using electrical models of strain sensor output.

8. A system for producing an instrumented wheelset according to claim 1, wherein said calibration means comprises:

a plurality of cell means for applying predetermined loads at predetermined portions of the wheelset; and calibration load recording means for recording strain sensor output resulting from applying the predetermined loads.

9. A system for producing an instrumented wheelset according to claim 8, wherein said calibration means comprises:

a plurality of index fingers for identifying lateral position of a load point on a tread of a wheelset being calibrated, and axle encoder means for encoding angular displacement of the wheelset being calibrated.

10. A method for producing an instrumented wheelset system, comprising the steps of:

(a) profiling a subject wheelset to produce a profiling output;

(b) performing a first modelling of the subject wheelset using the profiling output to determine a target position of strain sensors on a surface of the subject wheelset;

(c) performing a second modelling of the subject wheelset using simulated outputs of strain sensors positioned on the wheelset according to said first modelling of step (b);

(d) adjusting the target positions if the simulated outputs produced by said second modelling of step (c) exceed a predetermined threshold; and (e) installing the strain sensors on the subject wheelset at the target positions.

11. A method for producing an instrumented wheelset system according to claim 10, further comprising the step of:

(f) calibrating the subject wheelset using a calibration fixture applying predetermined loading conditions.

12. A method for producing an instrumented wheelset system according to claim 10, further comprising the step of:

(f) acquiring data from the strain sensors of a subject wheelset through a monitoring computer operable to discriminate a plurality of a corruptions.

13. A method for producing an instrumented wheelset system according to claim 10, wherein said first modelling of step (b) comprises the substeps of:

(b1) inputting a finite element model of the subject, wheelset, and (b2) analyzing the dynamic behavior of the wheelset modelled in step (b1) in response to a simulated applied load.

14. A method for producing an instrumented wheelset system according to claim 10, wherein said second modelling of step (c) comprises the substeps of:

(c1) inputting simulated applied loads to a finite element model of the wheelset; and (c2) simulating an output of the plurality of strain sensors using modelled characteristics of the strain sensors.

* * * * *